(12) United States Patent
Yamamoto et al.

(10) Patent No.: US 6,563,672 B2
(45) Date of Patent: May 13, 2003

(54) DISK CARTRIDGE

(75) Inventors: Kazuyuki Yamamoto, Kanagawa (JP); Kazuo Takahashi, Tokyo (JP); Toshio Mamiya, Tokyo (JP); Takashi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 83 days.

(21) Appl. No.: 09/776,685

(22) Filed: Feb. 6, 2001

(65) Prior Publication Data

US 2001/0036039 A1 Nov. 1, 2001

(30) Foreign Application Priority Data

Feb. 14, 2000 (JP) ......................................... 2000-039769

(51) Int. Cl.⁷ ............................................... G11B 23/03
(52) U.S. Cl. ...................................................... 360/133
(58) Field of Search ................................ 360/132, 133; 369/291

(56) References Cited

U.S. PATENT DOCUMENTS 6,021,029 A * 2/2000 Mamiya et al. .............. 360/133
6,125,012 A * 9/2000 Miyazaki et al. ............ 360/133
6,356,527 B1 * 3/2002 Shiomi et al. ............... 369/291

* cited by examiner

*Primary Examiner*—Allen Cao
(74) *Attorney, Agent, or Firm*—Oblon, Spivak, McClelland, Maier & Neustadt, P.C.

(57) ABSTRACT

A disk cartridge permits improved efficiency of airflow circulation in a disk accommodation chamber and improved efficiency of dust collection, and also allows the spring force of a shutter spring to be reduced. In a cartridge main body of the disk cartridge, a spring accommodation chamber is formed outside a disk accommodation chamber. The spring accommodation chamber is separated by upper and lower partitions of upper and lower halves so that it is discrete and independent from the disk accommodation chamber. An elastic member installed in the spring accommodation chamber is used to rotatably drive a shutter opening and closing arm in the direction for closing.

17 Claims, 21 Drawing Sheets

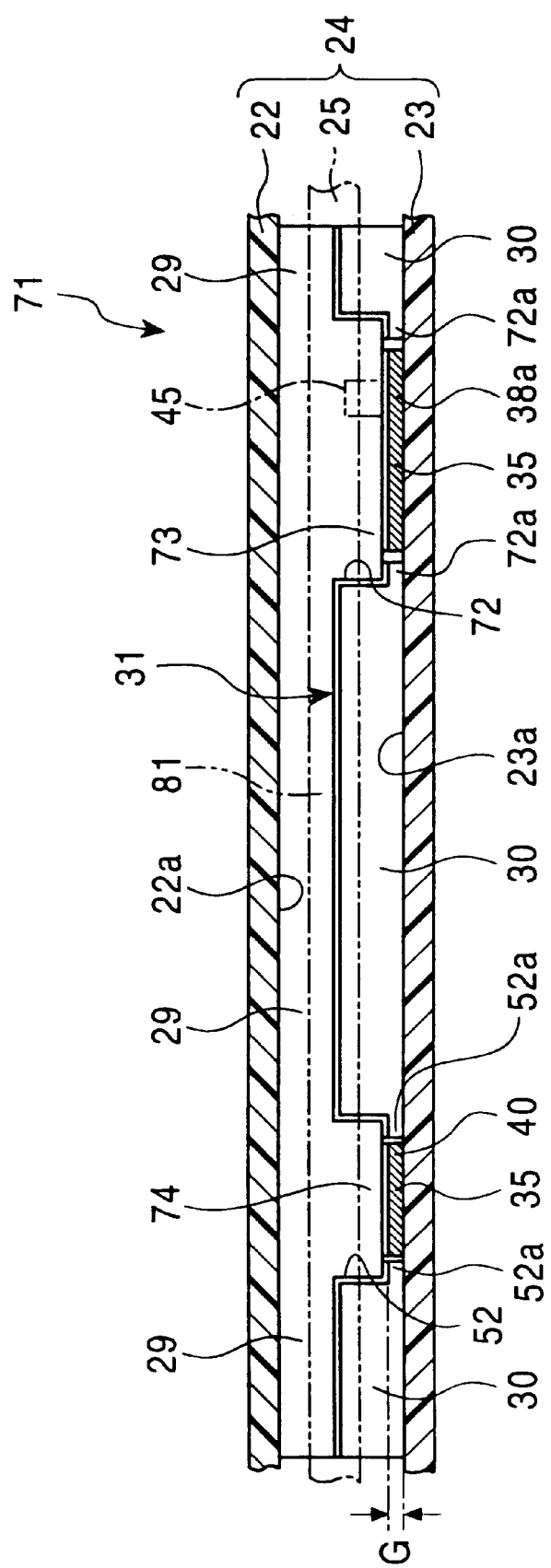

BACKGROUND ART

DISK CARTRIDGE

BACKGROUND OF THE INVENTION

1. Field of the Invention

The present invention relates to a disk cartridge ideally suited for use in a large-capacity disk drive, such as a removable hard disk drive unit.

2. Description of the Related Art

FIG. 16 shows an example of a hard disk drive unit proposed by the assignee under U.S. patent application Ser. No. 09/299,498 or Japanese Unexamined Patent Application No. 11-312353. The hard disk drive unit is a removable hard disk drive unit 1 (hereinafter referred to simply as "R-HDD 1") in which an upper cover 3 closes the top of a drive main body 2 having an open top, and a cartridge holder 4 is disposed at front in the drive main body 2. A cartridge insertion slot 5 is formed substantially over the full width of a front edge 4a of the cartridge holder 4. A pair of right and left hinge pins 6 are disposed at the right and left ends of a rear edge 4b of the cartridge holder 4. The front edge 4a of the cartridge holder 4 can be raised and lowered in directions indicated by arrows a and b, which are vertical in relation to the drive main body 2, about the paired right and left hinge pins 6 by a cartridge lifting device (not shown) installed at the bottom on the front edge side of the cartridge holder 4. A spindle motor 7 is disposed under the cartridge holder 4 in the drive main body 2. A chucking magnet 9 is embedded in the disk table 8 rotated together with a rotor of the spindle motor 7. Furthermore, a flexible head actuator 10, which is a rotary head actuator, is disposed at the rear of the cartridge holder 4 in the drive main body 2. The flexible head actuator 10 has a pair of upper and lower suspensions 12 mounted on the distal end of a head arm 11 by being bent at a predetermined angle, and a pair of upper and lower flying head sliders 13 mounted on the distal ends of the pair of upper and lower suspensions 12. The flexible head actuator 10 is constructed such that it is rotatably driven in longitudinal directions indicated by arrows c and d. A dynamic load and unload lamp (hereinafter referred to simply as "lamp") 14 is disposed between the pair of upper and lower suspensions 12.

Referring now to FIG. 17, a disk cartridge 21 used with the R-HDD 1 includes a flat cartridge main body 24 formed of upper and lower halves or upper and lower shells 22 and 23, respectively, that are composed of synthetic resin moldings and vertically fastened into a one piece by screws, an adhesive agent, or the like, and a recording disk (hereinafter referred to simply as "disk") 25, which is a removable hard disk rotatably accommodated in the cartridge main body 24. A center core 26 composed of a ferromagnetic member is secured to the center of the disk 25. A head insertion slot 27, which is long sideways, is formed by the upper and lower halves 22 and 23, the slot 27 being positioned at one side of an arcuate front edge 24a of the cartridge main body 24. Substantially at the center of the lower half 23, there is a circular disk table insertion aperture 28 in which the center core 26 of the disk 25 is fitted with a play.

As indicated by the one-dot chain line in FIG. 16, with the front edge 4a of the cartridge holder 4 of the R-HDD 1 raised in the direction indicated by arrow a, the disk cartridge 21 shown in FIG. 17 is inserted aslant into the cartridge holder 4 in the direction indicated by arrow e through the cartridge insertion slot 5 from the front edge 24a of the cartridge holder 4. Thereafter, as indicated by the solid line in FIG. 16, the front edge 4a of the cartridge holder 4 is lowered in the direction indicated by arrow b to mount the cartridge holder 4 of the disk cartridge 21 on a pair of a height reference pin (not shown) and a positioning pin (not shown) located at right and left, respectively, in the drive main body 2 so as to position the cartridge holder 4. Then, the disk table 8 of the spindle motor 7 is relatively inserted from below into the disk table insertion aperture 28 of the cartridge main body 24, and the center core 26 of the disk 25 is magnetically chucked onto the disk table 8 by the chucking magnet 9.

After loading the disk cartridge 21, the disk 8 is rotatably driven at high speed by the spindle motor 7, and the flexible head actuator 10 is rotatably driven in the direction indicated by arrow c to cause the pair of upper and lower suspensions 12 to slide on the lamp 14 in the direction indicated by arrow c so as to reduce the vertical gap between the paired upper and lower suspensions 12 by the spring force of the suspensions 12 themselves. Then, the paired upper and lower suspended head sliders 13 are inserted into the head insertion slot 27 of the disk cartridge 21 from the direction indicated by arrow c to load the suspended head sliders 13 onto the upper and lower recording surfaces of the disk 25. The flexible head actuator 10 circularly moves in the directions indicated by arrows c and d to cause the pair of upper and lower suspended head sliders 13 to perform a seek in the directions indicated by arrows c and d between the inner and outer peripheries of the disk 25, thereby recording or reproducing information on or from the disk 25. After completion of recording or reproducing on or from the disk 25, the front edge 4a of the cartridge holder 4 is raised in the direction indicated by arrow a, and the disk cartridge 21 is drawn out upward aslant in the direction indicated by arrow f through the cartridge insertion slot 5, as indicated by the one-dot chain line in FIG. 16.

Using the flexible head actuator 10 as the rotary head actuator makes it possible to minimize the width of the head insertion slot 27 of the disk cartridge 21 and to achieve a simplified configuration and higher reliability of the dynamic loading and unloading device of the pair of upper and lower suspended head sliders 13, thus permitting the R-HDD 1 to have higher quality. While recording or reproducing on or from the disk 25, the pair of upper and lower suspended head sliders 13 is raised due to the airflows generated on the upper and lower recording surfaces by the high-speed rotation of the disk 25, thus recording or reproducing information in a non-contact state.

The disk cartridge 21 shown in FIG. 17 through FIG. 21 includes a plurality of rib-shaped upper partitions 29 and lower partitions 30 that are divided in the peripheral direction and arc-shaped along a rear edge 24b and right and left edges 24c and 24d, which are three edges of the cartridge main body 24, excluding the front edge 24a. The upper partitions 29 and the lower partitions 30 are formed into one piece such that they are perpendicular to vertically opposing inner surfaces 22a and 23a of the upper and lower halves 22 and 23, respectively, and are vertically symmetrical. The upper and lower halves 22 and 23 are vertically combined into one piece to vertically abut the plural upper and lower partitions, 29 and 30, respectively, thereby forming a substantially circular disk accommodation chamber 31 surrounded by these plural upper and lower partitions 29 and 30, respectively. The disk 25 is rotatably and horizontally inserted in the disk accommodation chamber 31, and the round disk table insertion aperture 28 is formed in the lower half 23, at a position corresponding substantially to the center of the disk accommodation chamber 31. In this case, a plurality of, e.g., three, dowels 32 are integrally formed on the inner surface 23a of the lower half 23 and on the outer periphery of the disk table insertion aperture 28. The center core 26 of the disk 25 is positioned by placing it on the dowels 32, and the disk 25 is horizontally supported in such a manner that it floats upward with respect to the inner surface 23a of the lower half 23.

A shutter 35 made of a thin metal plate, such as a stainless plate, is horizontally disposed on the inner surface 23a of the lower half 23, under the disk 25 so that the shutter 35 longitudinally extends in the disk accommodation chamber 31. The shutter 35 is formed by integrally pressed portions, namely, a disk table insertion aperture opening and closing portion 36 formed in a narrow, substantially fan-shaped horizontal plate, a head insertion aperture opening and closing portion 37 which is vertically bent upward at the end on the front edge of the disk table insertion aperture opening and closing portion 37 (adjacent to the front edge 24a of the cartridge main body 24) and is formed in an arc shape along the inner side of the front edge 24a of the cartridge main body 24, a proximal end portion 38 forming an end portion adjacent to a pivot that is formed near the rear edge of the disk table insertion aperture opening and closing portion 36 (adjacent to the rear edge 24b of the cartridge main body 24), a spring locking portion 39 formed on one side surface 36a of the disk table insertion aperture opening and closing portion 36 and in the vicinity of the proximal end portion 38, and an opening and closing arm 40 that is formed on the side surface 36a of the disk table insertion aperture opening and closing portion 36, extends into one side direction from a position considerably shifted toward the front edge from the proximal end portion 38, and is formed into an arc centering about a pivot pin 45 of the proximal end portion 38, which will be discussed hereinafter. A substantially central portion of the other side surface of the disk table insertion aperture opening and closing portion 36, namely, a side surface 36b, is provided with a cutout 41 serving as the relief for the disk table insertion aperture 28. Another cutout 42 serving as the relief for a filter accommodating portion 59, which will be discussed hereinafter, is formed at the position near the front edge of the side surface 36a.

Furthermore, a spring accommodation chamber 44 is provided at the rear end of the disk accommodation chamber 31 so that it is shifted onto one side from the center of the cartridge main body 24, and is in communication with the disk accommodation chamber 31. The spring accommodation chamber 44 is formed by depressing, toward the rear (outward), a part of the upper partition 29 of the upper half 22 and the lower partition 30 of the lower half 23 constituting the outer peripheral wall of the disk accommodation chamber 31. On one side in the spring accommodation chamber 44, the proximal end portion 38 of the shutter 35 is rotatably fitted to a pivot pin 45, which serves as a pivot for circular movement, and is vertically and integrally formed on the inner surface 23a of the lower half 23, so that the shutter 35 may circularly move to the right and left, that is, in the directions indicated by arrows g and h, about the pivot pin 45. As a shutter spring, a twisted coil spring 47 having a large spring force or a spring constant is employed. A coil portion 48 of the twisted coil spring 47 is fitted and mounted from above onto the outer periphery of a boss-shaped spring retainer 46 vertically and integrally formed on the inner surface 23a of the lower half 23 on the other side in the spring accommodation chamber 44. An operating end 49 and a fixed end 50 of the twisted coil spring 47 that together form substantially a U shape, the distal end of the operating end 49 being retained by a spring retaining portion 39 of the shutter 35. The distal end of the fixed end 50 is abutted against the inner side of a recessed portion of the lower partition 30 of the lower half 23 thereby to rotatably urge the shutter 35 from an opening position shown in FIG. 20 to the closing position shown in FIG. 21 in the direction indicated by arrow g by the spring force of the operating end 49. A pair of guide slots 51 formed in the disk table insertion aperture opening and closing portion 36 of the shutter 35 and shaped like arcs around the pivot pins 45 are slidably engaged with two of the three dowels 32 integrally formed around the disk table insertion aperture 28 on the inner surface 23a of the lower half 23, thereby guiding the shutter 35 by these dowels 32. The front edge 24a of the cartridge main body 24 and the head insertion slot opening and closing portion 37 of the shutter 35 on the inner side thereof are shaped like arcs around the pivot pin 45.

The opening and closing arm 40 of the shutter 35 passes through a recessed portion 52, which is a cutout formed in a part of the lower partition 30 of the lower half 23, and juts out to one side adjacent to the rear edge 24b of the cartridge main body 24 outside the disk accommodation chamber 31. Furthermore, a distal end 40a of the opening and closing arm 40 projects outward from a slit 53 horizontally formed between the upper and lower halves 22 and 23, at the rear end of the side portion 24c of the cartridge main body 24. The distal end 40a of the opening and closing arm 40 is flexed upward from the opening and closing arm 40 by a substantially crank-shaped flexible portion 40b, then horizontally projected outward sideways from the slit 53. As described in conjunction with FIG. 16, when the disk cartridge 21 is inserted aslant in the direction indicated by arrow e into the cartridge holder 4 of the R-HDD 1 from the front edge 24a of the cartridge main body 24, the distal end 40a of the opening and closing arm 40 is relatively driven in the direction indicated by arrow f from the closing position shown in FIG. 21 to the opening position shown in FIG. 20 by a shutter opening device (not shown) provided on one side in the cartridge holder 4. This causes the shutter 35 to be circularly moved about the pivot pin 45 in the direction indicated by arrow h from the closing position shown in FIG. 21 to the opening position shown in FIG. 20 against the spring force of the operating end 49 of the twisted coil spring 47. Thus, the head insertion slot 27 and the disk table insertion aperture 28 of the cartridge main body 24 are simultaneously opened.

As explained with reference to FIG. 16, when the disk cartridge 21 is drawn out from the cartridge holder 4 of the R-HDD 1 in the direction indicated by arrow f after recording or reproducing information on or from the disk 25, the shutter 35 is automatically swung about the pivot pin 45 in the direction indicated by arrow g from the opening position shown in FIG. 20 to the closing position shown in FIG. 21 by the spring force of the operating end 49 of the twisted coil spring 47. Thus, the head insertion slot 27 and the disk table insertion aperture 28 of the cartridge main body 24 are automatically closed by the head insertion slot opening and closing portion 37 and the disk table insertion aperture opening and closing portion 36 of the shutter 35.

In the vicinity of the right and left corners of the lower half 23, at the rear edge 24b of the cartridge main body 24, a pair of right and left boss-shaped positioning protuberances 57 and 56, respectively, are integrally formed. The right protuberance 57 has an oval positioning aperture 55 opened therein, while the protuberance 56 has a round positioning aperture 54 opened therein. As explained in conjunction with FIG. 16, when the disk cartridge 21 is loaded in the direction indicated by arrow b by the cartridge holder 4, the pair of right and left positioning apertures 55 and 54 of the disk cartridge 21 are fitted from above onto a pair of right left positioning pins (not shown) provided in the drive main body 2 of the R-HDD 1, thereby positioning the disk cartridge 21 in the drive main body 2. Furthermore, in the lower half 23, a write protector 58 for preventing erroneous deletion of information from the disk 25 is installed on the inner side from the positioning protuberance 56 such that the write protector 58 may laterally slide. At the front edge 24a of the cartridge main body 24, in the corner area located on the opposite side from the head insertion slot 27, a substantially arcuate filter accommodation chamber 59 is formed at a position outside the disk accommodation chamber 31. The filter accommodation chamber 59 is defined by a part of the upper and lower partitions 29 and 30 of the upper and lower halves 22 and 23. Both arcuate ends of the filter accommodation chamber 59 are in communication with the disk accommodation chamber 31, and a circulation filter 60 is detachably installed in the filter accommodation chamber 59. At the time of recording or reproducing on or from the disk 25, the airflow generated when the disk 25 rotates at high speed in the disk accommodation chamber 31 is repeatedly circulated in the disk accommodation chamber 31, the spring accommodation chamber 44, and the filter accommodation chamber 59 so as to cause dust in the disk cartridge 21 to be adsorbed by the circulation filter 60, thereby collecting dust. Thus, air in the disk cartridge 21 is purified.

In the disk cartridge 21 described above, the spring accommodation chamber 44 formed by denting a part of the outer peripheral wall of the disk accommodation chamber 31 is in communication with the disk accommodation chamber 31.

According to the construction set forth above, however, the spring accommodation chamber 44 is formed by denting outward a part of the outer peripheral wall of the disk accommodation chamber 31, and a part of the outer peripheral wall of the disk accommodation chamber 31 is cut off. Hence, an airflow that is produced when the disk 25 is rotated at high speed in the disk accommodation chamber 31, and moves along the upper and lower partitions 29 and 30 constituting the outer peripheral wall of the disk accommodation chamber 31 may be disturbed in the spring accommodation chamber 44 formed of outward dent. As a result, there is a danger in that smooth airflow may be prevented in the disk accommodation chamber 31, and the efficiency of airflow circulation in relation to the circulation filter 60 may be deteriorated, resulting in deteriorated dust collecting efficiency of the circulation filter 60.

As the type of the disk cartridge previously applied by the assignee, there is one disclosed in, for example, U.S. Pat. No. 5,949,630, wherein the disk accommodation chamber of a cartridge is provided with a partitioning member for providing a partition in the direction in which a pair of shells constituting the cartridge overlap, and a twisted coil spring is accommodated, via the partitioning members, in the direction for overlapping the disk. In this construction, however, the disk, the partitioning member, and the twisted coil spring inevitably overlap in the axial direction of the disk, making it difficult to reduce the thickness of the cartridge.

SUMMARY OF THE INVENTION

The present invention has been made with a view toward solving the problems described above, and it is an object of the present invention to provide a disk cartridge that is thinner and capable of significantly improving the circulation efficiency of airflow in a disk accommodation chamber and the efficiency of dust collection, and also permits a reduction in the required spring force of a shutter spring that rotatably urges a shutter in the direction for closing.

To this end, according to one aspect of the present invention, there is provided a disk cartridge characterized in that a spring accommodation chamber separated by a partition is formed outside a disk accommodation chamber in a cartridge body, and a shutter spring for rotatably urging a shutter in a direction for closing is housed in the spring accommodation chamber.

In the disk cartridge in accordance with the present invention constructed as described above, the shutter spring for rotatably urging the shutter in the direction for closing is housed in the spring accommodation chamber that is located outside the disk accommodation chamber and separated by the partition. This arrangement restrains inflow or outflow of air between the disk accommodation chamber and the spring accommodation chamber, so that an airflow in the disk accommodation chamber will not be disturbed, thus ensuring smooth airflows.

BRIEF DESCRIPTION OF THE DRAWINGS

FIG. 2 is a sectional side view taken along the line II—II in FIG. 1;

DESCRIPTION OF THE PREFERRED EMBODIMENTS

Figure 1:
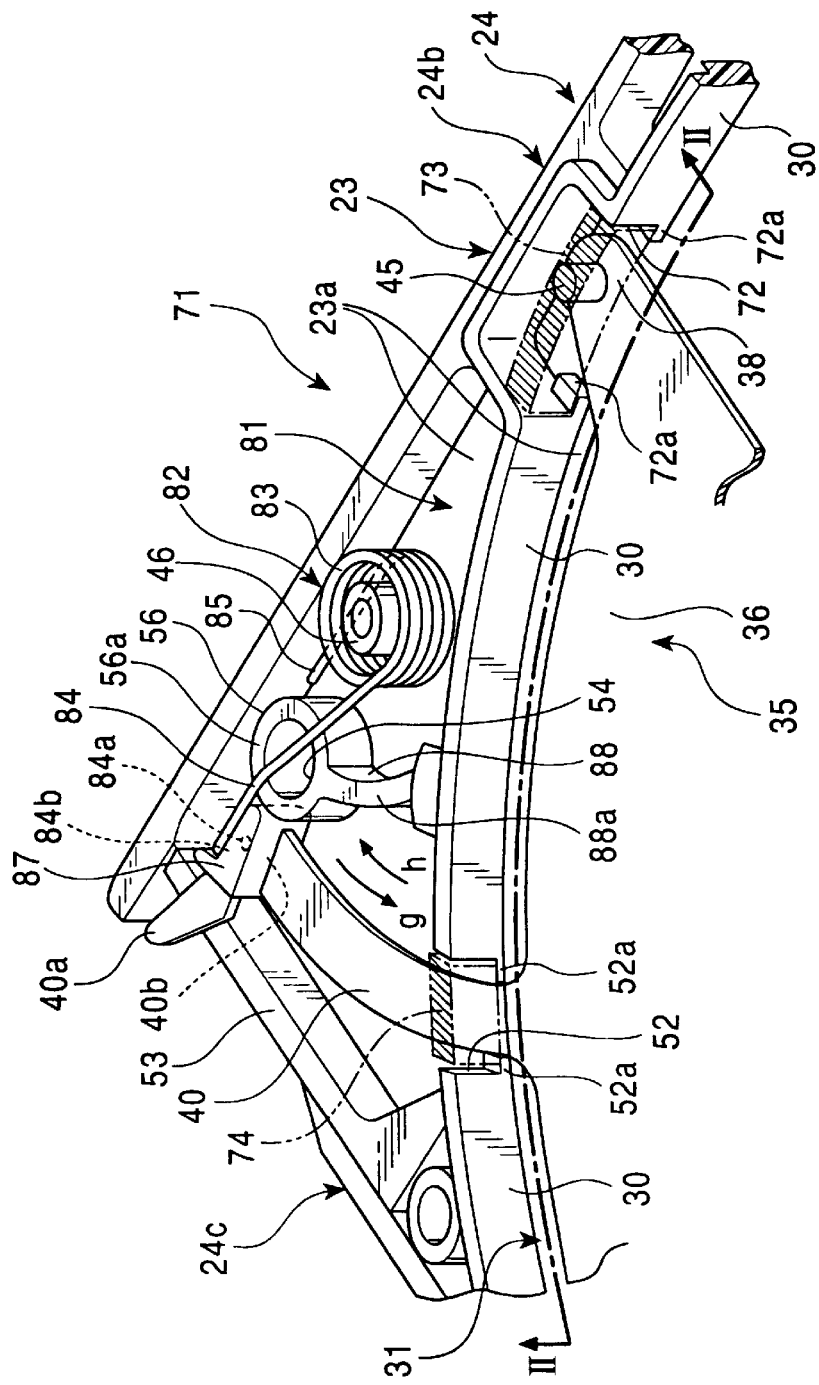
FIG. 1 is a perspective view of an essential section illustrating a first embodiment of a disk cartridge to which the present invention has been applied.
Figure 3A:
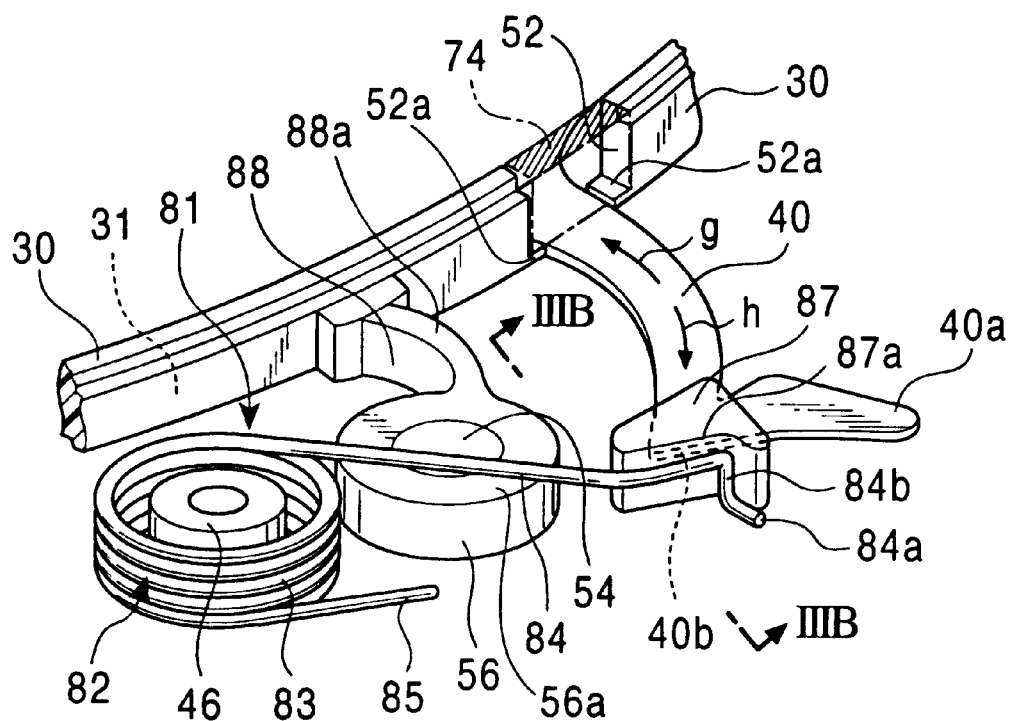
FIG. 3A is a perspective view illustrating a portion where a twisted coil spring and an opening and closing arm of a shutter of the disk cartridge according to the first embodiment are in contact.
Figure 3B:
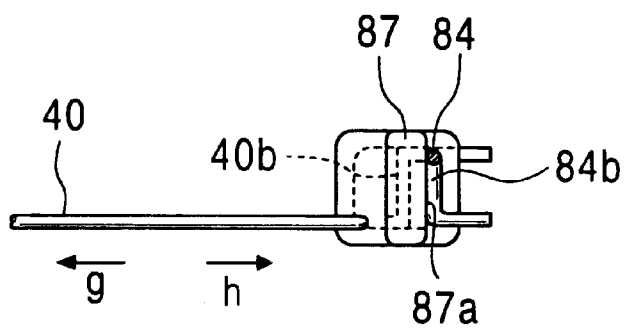
FIG. 3B is a sectional view taken along the line IIIB—IIIB.
Figure 4:
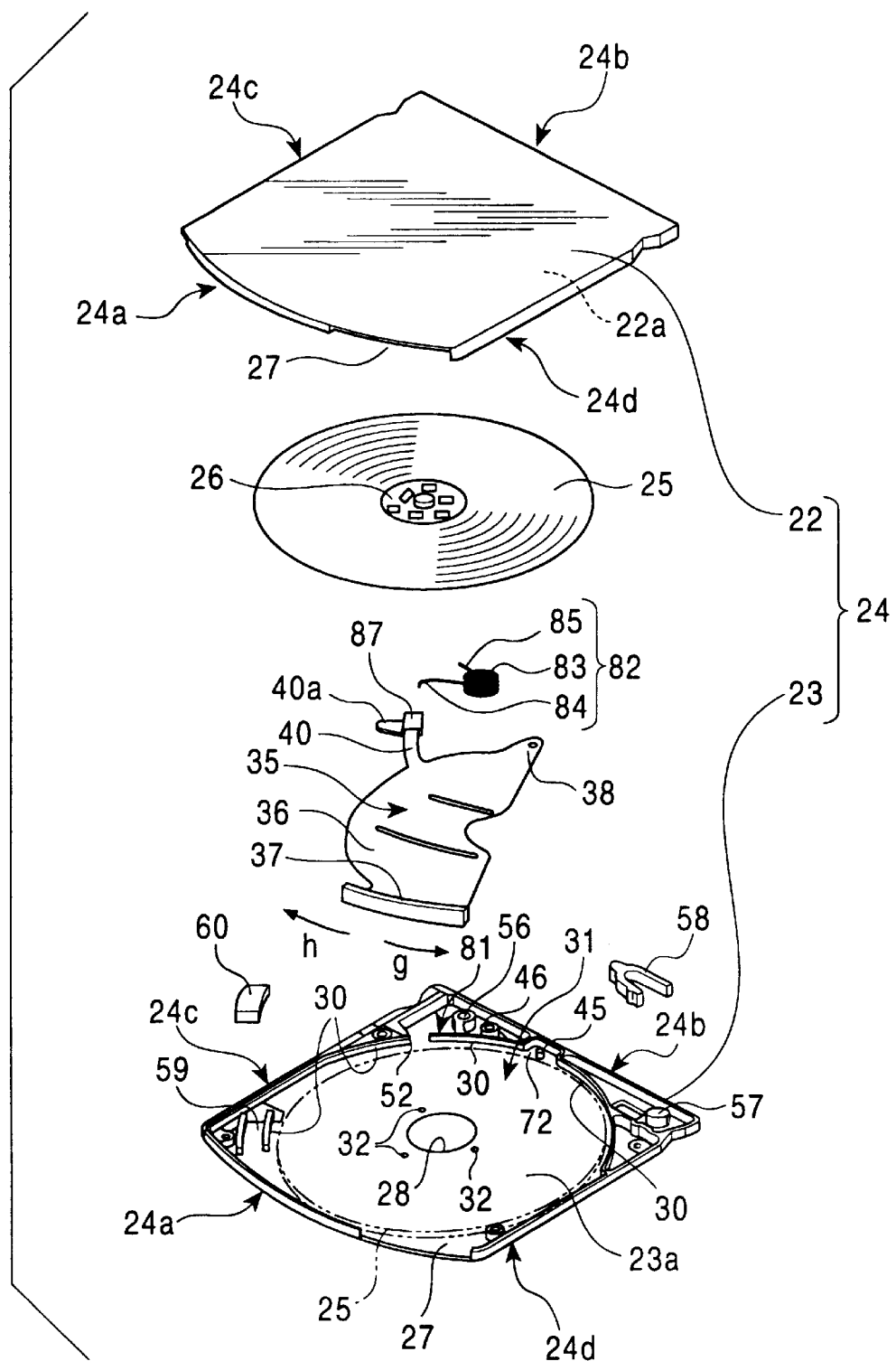
FIG. 4 is an exploded, perspective view of the entire disk cartridge according to the first embodiment.
Figure 5A:
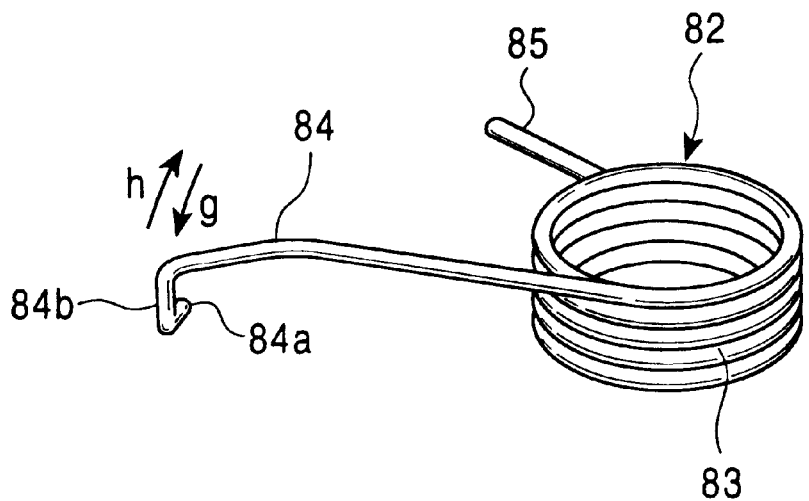
FIGS. 5A and 5B is a perspective view of the twisted coil spring constituting a shutter spring of the first embodiment.
Figure 5B:
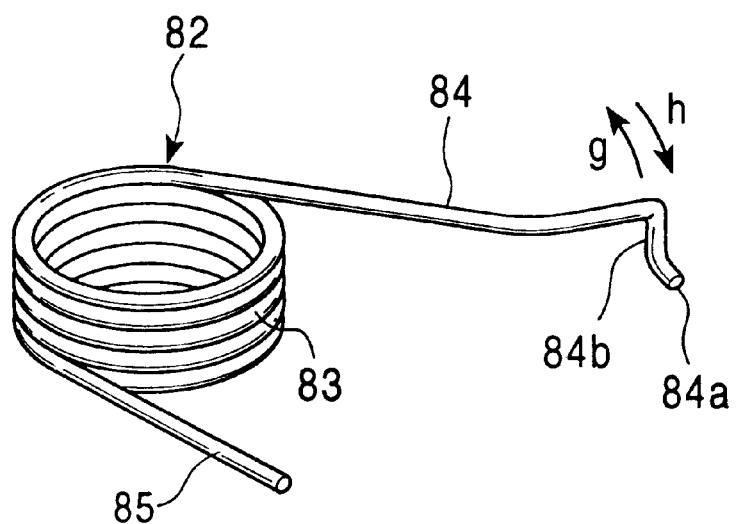

Referring now to FIG. 1 through FIG. 15, the embodiments in which the present invention has been applied to disk cartridges for R-HDD will be described. The like components as those shown in FIG. 16 to FIG. 21 will be assigned like reference numerals, and the descriptions thereof will not be repeated.

[First Embodiment]

A first embodiment of the disk cartridge will be described with reference to FIG. 1 through FIG. 8. In a disk cartridge 71 in accordance with the present invention, a narrow cutout recess 72 in which only a proximal end portion 38, which is a swing pivot end portion, of a shutter 35 can be inserted is formed adjacently to a rear edge 24b of a cartridge main body 24. The recess 72 is formed in a part of an arcuate lower partition 30 of the outer periphery of a disk accommodation chamber 31 formed on a lower half 23. The proximal end portion 38 is projected out of the recess 72 and outside the recess 72, the proximal end portion 38 is rotatably mounted on a pivot pin 45 serving as a swing pivot of a lower half 23. Two downward, vertical, arcuate protuberances 73 and 74 integrally formed at two locations on a lower edge of an arcuate upper partition 29 on the outer periphery of the disk accommodation chamber 31 formed on an upper half 22 are fitted from above into the recess 72 and a recess 52 thereby to close the recesses. The recess 52 is a cutout which is formed in the lower partition 30 of the lower half 23, and in which an opening and closing arm 40 of the shutter 35 is inserted. In this case, paired right and left stepped portions 72a and 52a having a height equivalent to the thickness of the shutter 35 are integrally formed at the bottom ends of the two recesses 72 and 52. The right and left ends of the bottom surfaces of the two protuberances 73 and 74 are abutted against the stepped portions 72a and 52a to secure gap G between the bottom surfaces of the protuberances 73 and 74 and an inner surface 23a of the lower half 23 so as to allow the proximal end portion 38 and the opening and closing arm 40 to be inserted in gap G.

Thus, the recesses 72 and 52, which are formed of the two cutouts of the arcuate lower partition 30 of the lower half 23, are closed by the protuberances 73 and 74 integrally formed at the two locations on the lower edge of the arcuate upper partition 29 of the upper half 22. This arrangement makes it possible to form the upper and lower partitions 29 and 30 on the outer periphery of the disk accommodation chamber 31 into a smooth perfect arcuate shape. Therefore, an airflow generated when a disk 25 rotates at high speed when recording or reproducing on or from the disk 25 will not be disturbed. The airflow can be smoothly passed along the partitions 29 and 30 into a filter accommodation chamber 59. As a result, the circulation efficiency of airflows between the disk accommodation chamber 31 and the filter accommodation chamber 59 can be markedly improved, and the efficiency of dust collection by a circulation filter 60 installed in the filter accommodation chamber 59 can be also significantly improved.

The disk cartridge 71 includes a spring accommodation chamber 81 disposed in a substantially triangular space formed by the arcuate upper and lower partitions 29 and 30 of the upper and lower halves 22 and 23 at the rear edge of the cartridge main body 24, the rear edge 24b of the cartridge main body 24, and one side 24c of the cartridge main body 24. Hence, the spring accommodation chamber 81 is formed to be a discrete compartment that is substantially completely separated and independent in the diametral direction of a disk in relation to the disk accommodation chamber 31 by the upper and lower partitions 29 and 30 of the upper and lower halves 22 and 23, and the two protuberances 73 and 74. As in the prior art, the opening and closing arm 40, a spring retainer 46, and one positioning protuberance 56 of the shutter 35 are disposed in the spring accommodation chamber 81.

In the first embodiment, a twisted coil spring 82 having a smaller spring force or a spring constant is employed for the shutter, and the twisted coil spring 82 is installed around the outer periphery of the spring retainer 46 by a coil portion 83. An operating end 84 and a fixed end 85 of the twisted coil spring 82 that are substantially formed into a U shape are extended from the spring retainer 46 toward the opening and closing arm 40 of the shutter 35, which is opposite from the direction in the prior art. A distal end 84a of the operating end 84 is locked at a position in the vicinity of the distal end 40a of the arcuate opening and closing arm 40, and the distal end of the fixed end 85 is secured to the lower half 23 at the inner side of the rear edge 24b of the cartridge main body 24, thereby rotatably urging the shutter 35 via the opening and closing arm 40 in the direction indicated by arrow g, which is the direction for closing, by the spring force of the operating end 84. In the shutter 35 according to the present invention, the conventional spring retaining portion 39 formed in the vicinity of the proximal end portion 38 has been eliminated.

Thus, the twisted coil spring 82 is installed in the spring accommodation chamber 81 that is completely separated and independent from the disk accommodation chamber 31, making it possible to prevent air in the disk accommodation chamber 31 from flowing into or out of the spring accommodation chamber 81. Therefore, the dust adhering or accumulating in the spring accommodation chamber 81 can be prevented from moving into the disk accommodation chamber 31 and from adhering to the upper and lower recording surfaces of the disk 25, which would lead to failure, such as recording and/or reproducing errors or a crash of the upper and lower recording surfaces of the disk 25 and a pair of upper and lower flying head sliders 13.

Moreover, the distal end 84a of the operating end 84 of the twisted coil spring 82 is locked in the vicinity of the distal end 40a of the opening and closing arm 40 of the shutter 35. With this arrangement, arm length L2, which is the distance between the pivot pin 45 for generating torque for rotatably urging the shutter 35 to swing about the pivot pin 45 by the operating end 84 in the direction indicated by arrow g, which is the direction for closing, and the position in the vicinity of the distal end 40a of the opening and closing arm 40 can be increased by a few times the corresponding arm length in the prior art. Therefore, the spring force or the spring constant of the twisted coil spring 82 can be reduced to a fraction of that in the prior art. This enables the twisted coil spring 82 to be made smaller, contributing to a reduction in size and thickness of the cartridge main body 24.

In the disk cartridge 71 in accordance with the present invention, a spring shoe 87 made of a synthetic resin, such as ABS resin, is integrally formed on the outer periphery of a bent portion 40b, which is formed by bending the distal end 40a upward and sideways outward from the opening and closing arm 40 substantially into a crank shape at a position near the distal end 40a of the opening and closing arm 40. The spring shoe 87 serves to prevent the operating end 84 of the metal twisted coil spring 82 and the opening and closing arm 40 of the metal shutter 35 from directly rubbing against each other, which would produce metal powder (raising dust) or increase sliding resistance. Furthermore, a bent portion 84b bent downward at right angles is formed in the vicinity of the operating end 84, and the distal end 84a is bent at right angles from the bottom end of the bent portion 84b in the direction indicated by arrow h, which is away from the spring shoe 87. This is for preventing the distal end 84a of the operating end 84 from coming in contact with a perpendicular spring pressing surface 87a of the spring shoe 87 at right angles and the cut surface of the distal end 84a of the operating end 84 from cutting the spring pressing surface 87a of the spring shoe 87 made of a synthetic resin, which would produce synthetic resin powder (raising dust).

Figure 6:
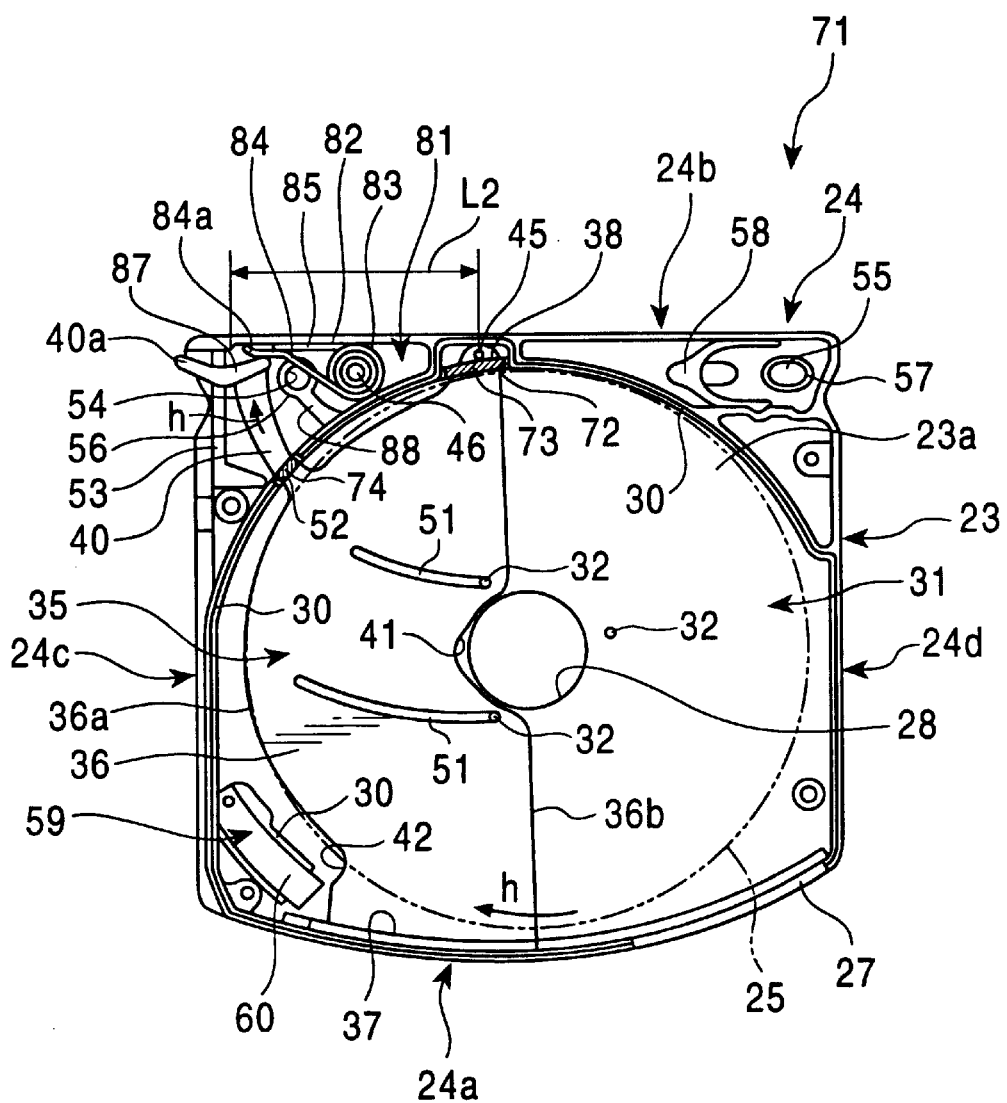
FIG. 6 is a partly cut-away top plan view of a lower half when the shutter of the disk cartridge of the first embodiment is open.
Figure 7:
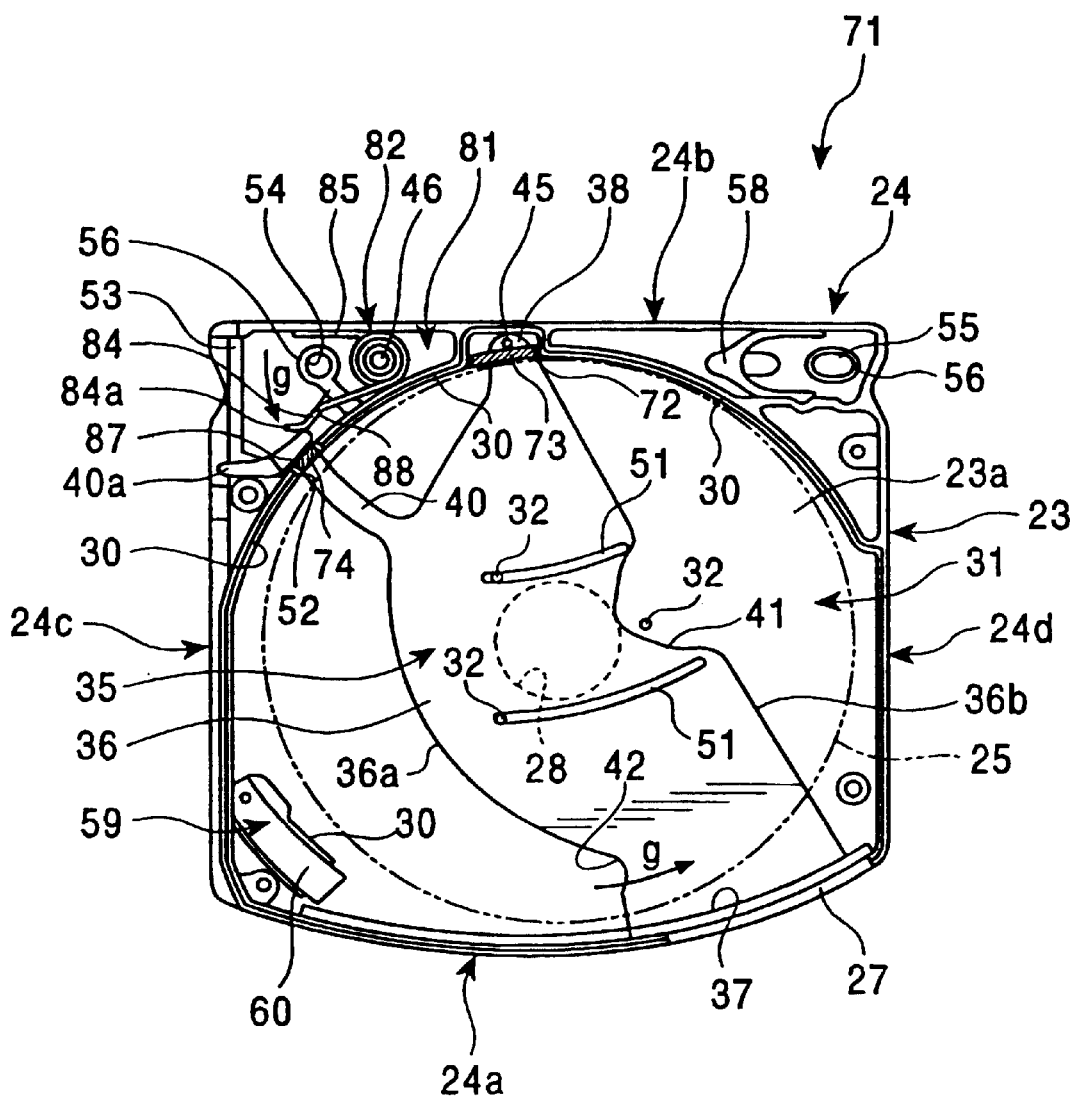
FIG. 7 is a partly cut-away top plan view of the lower half when the shutter shown in FIG. 6 is closed.

With this arrangement, when the operating end 84 of the twisted coil spring 82 is moved in the directions indicated by arrows g and h between the shutter opening position shown in FIG. 6 and the shutter closing position shown in FIG. 7, a smooth side surface of the bent portion 84b allows the operating end 84 to smoothly slide on the perpendicular spring pressing surface 87a of the spring shoe 87 made of a synthetic resin, thus permitting a markedly reduced sliding resistance to be achieved. This makes it possible to prevent the dust raising problem in which synthetic resin powder is produced due to the spring pressing surface 87a being cut by the cut surface of the distal end 84a of the operating end 84, or opening or closing failure of the shutter 35 caused by undue sliding resistance generated between the operating end 84 and the opening and closing arm 40. Thus, the shutter 35 can be smoothly opened or closed in the directions indicated by arrows g and h by employing the twisted coil spring 82 having a smaller spring force.

Furthermore, in the disk cartridge 71 according to the present invention, the opening and closing arm 40 of the shutter 35 is driven by the operating end 84 of the twisted coil spring 82. With this arrangement, when the shutter 35 is circularly moved in the directions indicated by arrows g and h between the opening position shown in FIG. 6 and the closing position shown in FIG. 7, the operating end 84 of the twisted coil spring 82 is moved in the directions indicated by arrows g and h between the positioning protuberance 56 on the lower half 23 (FIG. 6) and the position away inward from the positioning protuberance 56 (FIG. 7). When the operating end 84 moves inward from the positioning protuberance 56 in the direction indicated by arrow g, if the operating end 84 should lower below the upper surface of the positioning protuberance 56, then the operating end 84 may be caught by the side surface of the positioning protuberance 56 when the shutter 35 is moved in the direction indicated by arrow h from the closing position to the opening position. This may cause the shutter 35 to fail to complete its opening movement in the direction indicated by arrow h.

To avoid the aforesaid problem, in the disk cartridge 71 in accordance with the present invention, a guide rib 88 shaped like an arc centering about the spring retainer 46 is integrally formed between the positioning protuberance 56 on the lower half 23 and the lower partition 30. An upper end surface 56a of the positioning protuberance 56 and an upper end surface 88a of the guide rib 88 are substantially flush. This arrangement enables the operating end 84 of the twisted coil spring 82 to be smoothly guided horizontally on the upper end surfaces 56a and 88a of the positioning protuberance 56 and the guide rib 88, respectively, in the directions indicated by arrows g and h. Hence, the shutter 35 can be safely and smoothly moved between the closing position and the opening position in the directions indicated by arrows g and h, so that opening failure or other malfunction of the shutter 35 can be restrained.

[Second Embodiment]

Figure 8:
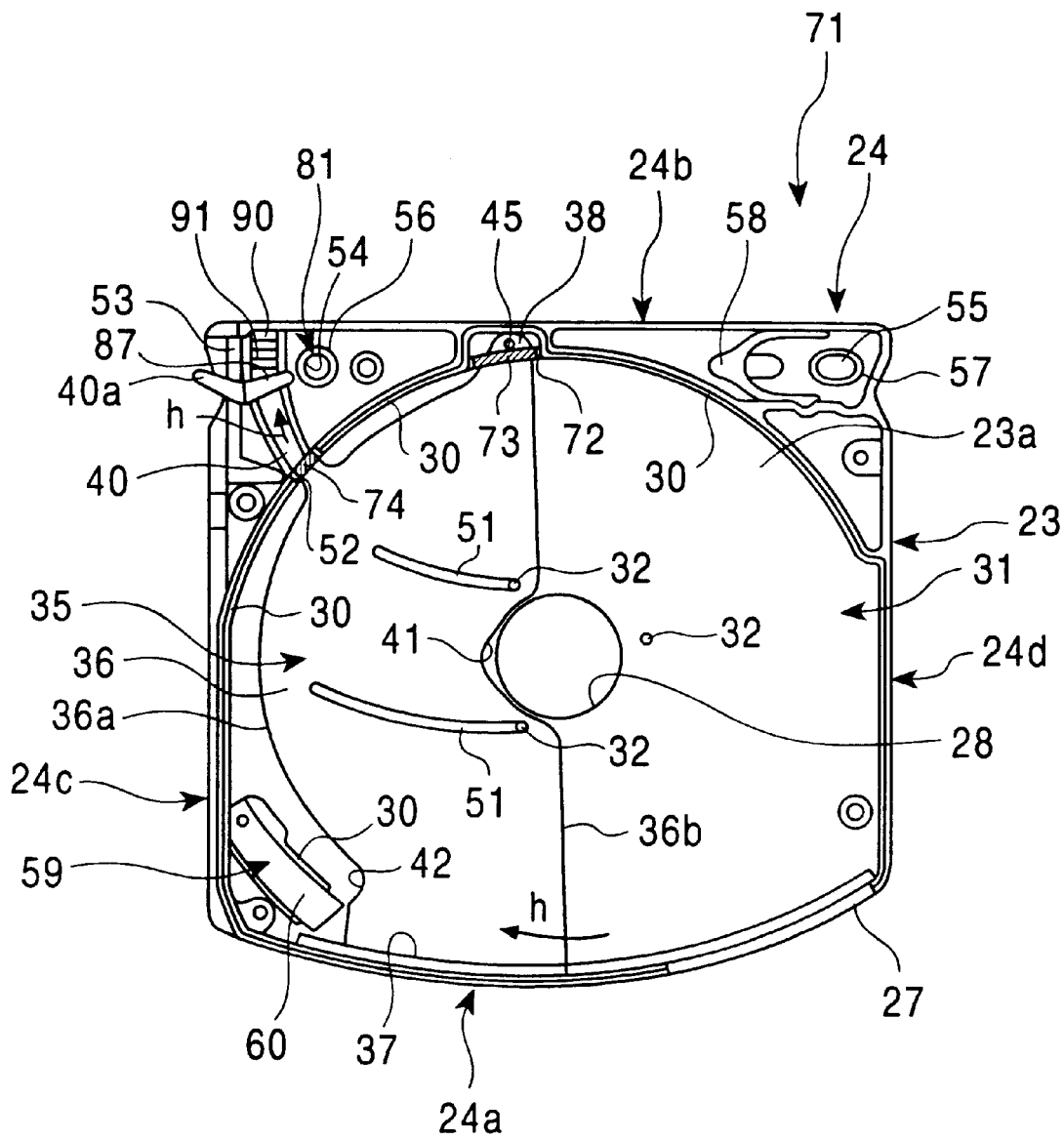
FIG. 8 is a partly cut-away top plan view of a lower half when a shutter is open in a second embodiment of the disk cartridge to which the present invention has been applied.
Figure 9:
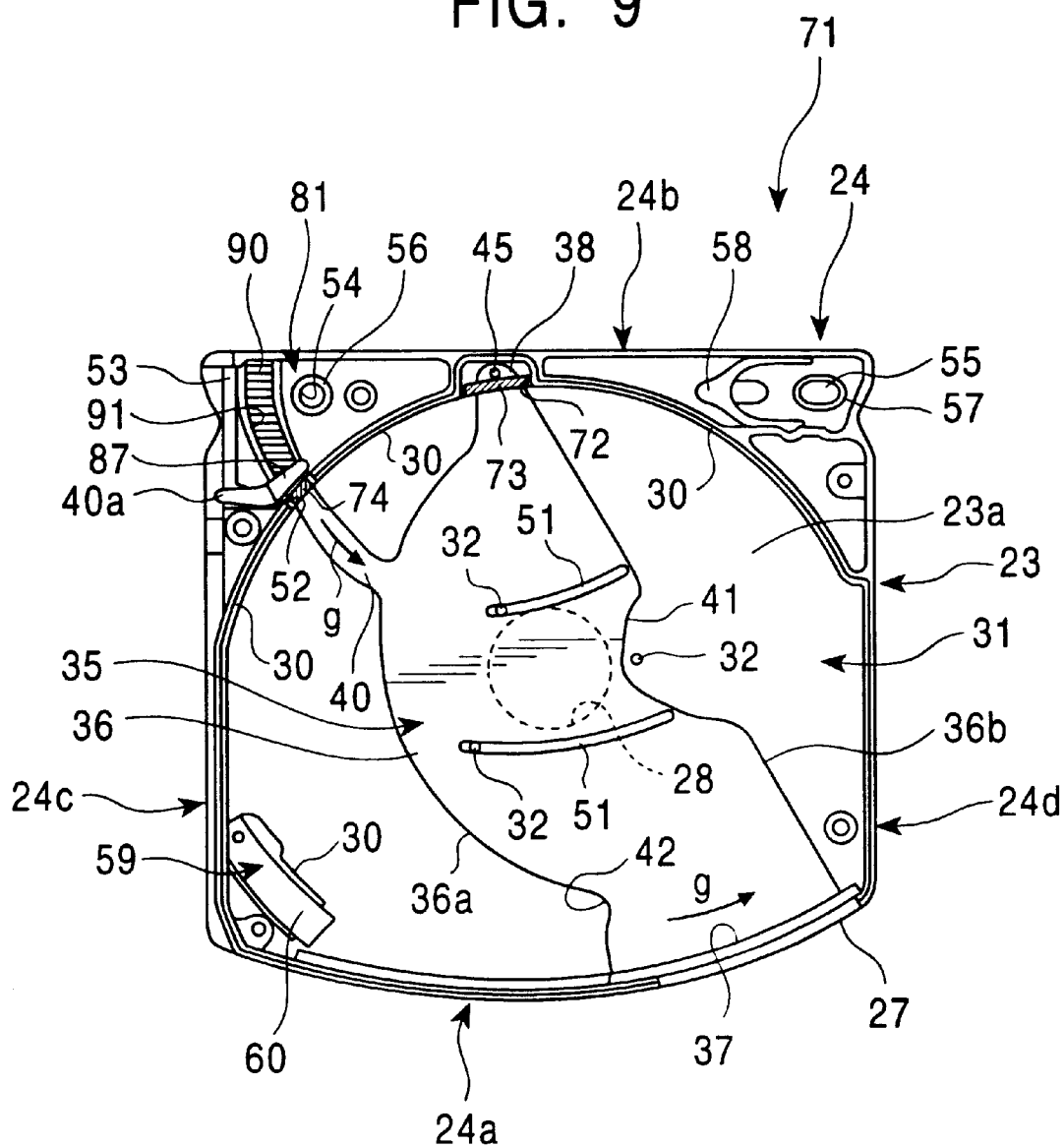
FIG. 9 is a partly cut-away top plan view of the lower half when the shutter shown in FIG. 8 is closed.

Referring now to FIG. 8 and FIG. 9, a second embodiment of the disk cartridge 71 in accordance with the present invention will be described. In the second embodiment, a compression coil spring 90 is used as the shutter spring. In this embodiment, an arcuate spring guide groove 91, for example, is integrally formed in a spring accommodation chamber 81 of a lower half 23. The spring guide groove 91 is formed so as to follow the movement track of an opening and closing arm 40 of a shutter 35. The compression coil spring 90 is arcuately positioned in the spring guide groove 91. The compressive repulsion of the compression coil spring 90 allows the opening and closing arm 40 to be smoothly pushed in the direction for closing, namely, in the direction indicated by arrow g.

[Third Embodiment]

Figure 10:
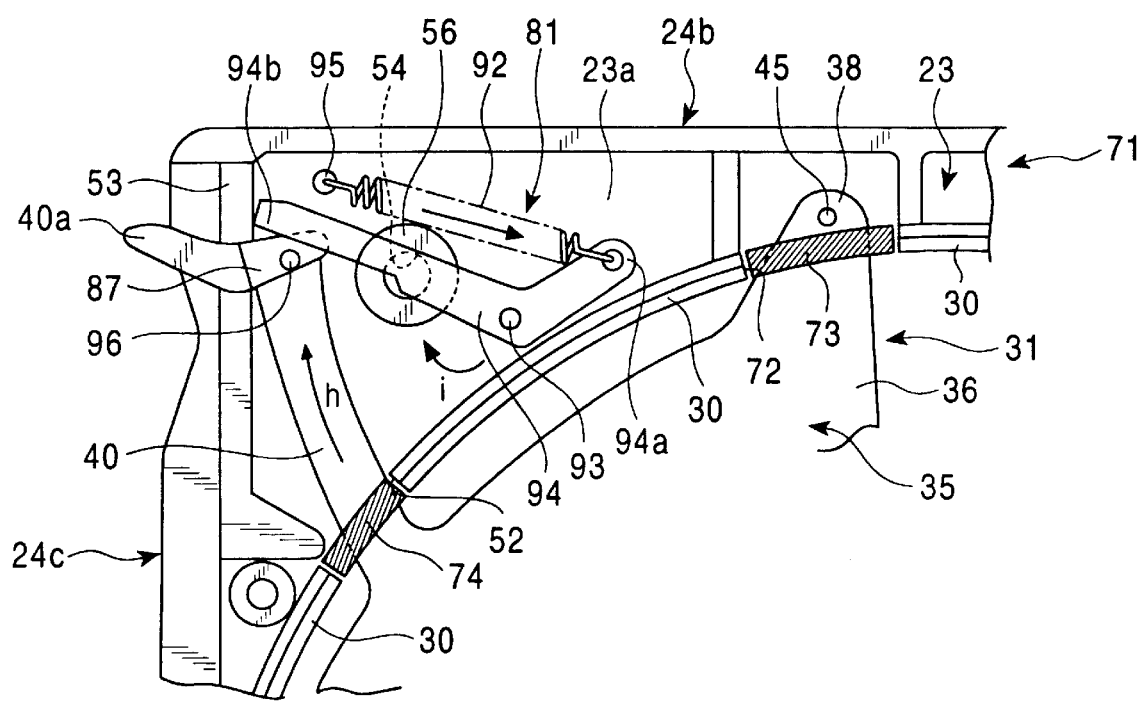
FIG. 10 is a partly cut-away top plan view of an essential section when a shutter is open in a third embodiment of the disk cartridge to which the present invention has been applied.
Figure 11:
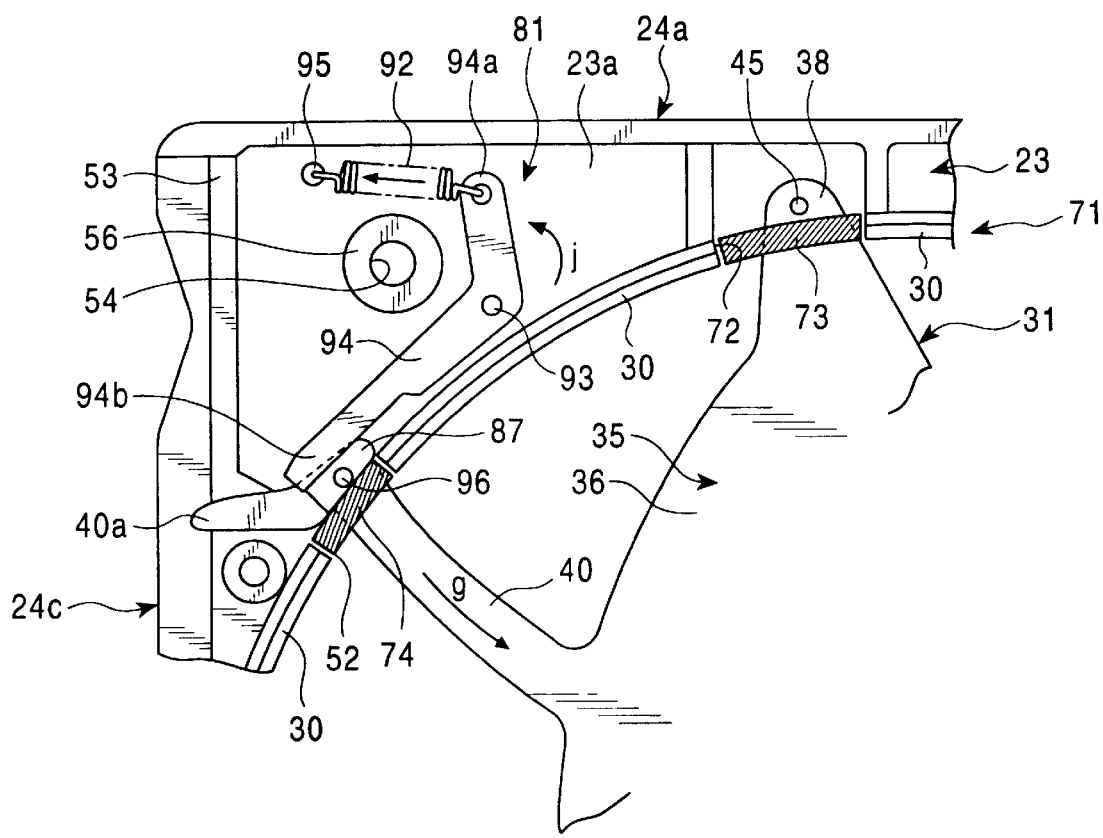
FIG. 11 is a partly cut-away top plan view when the shutter shown in FIG. 10 is closed.

Referring now to FIG. 10 and FIG. 11, a third embodiment of the disk cartridge 71 in accordance with the present invention will be described. In the third embodiment, a tension coil spring 92 is used as the shutter spring. In this embodiment, a crank arm 94, for example, is installed on the outer periphery of a pivot pin 93 integrally formed in a spring accommodation chamber 81 of a lower half 23 such that the crank arm 94 may rotate in the directions indicated by arrows i and j. The two ends of the tension coil spring 92 are held by one end 94a of the crank arm 94 and by a spring retainer 95 integrally formed on the lower half 23. A spring shoe 87 of an opening and closing arm 40 of a shutter 35 is directly driven, or a pin 96 integrally formed on the spring shoe 87 is driven in the direction indicated by arrow g by the other end 94b of the crank arm 94 by making use of the tensile force of the tension coil spring 92. This arrangement allows the leverage based on the arm ratio of the crank arm 94 to be utilized to permit smooth rotative drive of the shutter 35 in the direction for closing, namely, the direction indicated by arrow g even with a further reduced spring force of the tension coil sprig 92.

[Fourth Embodiment]

Figure 12:
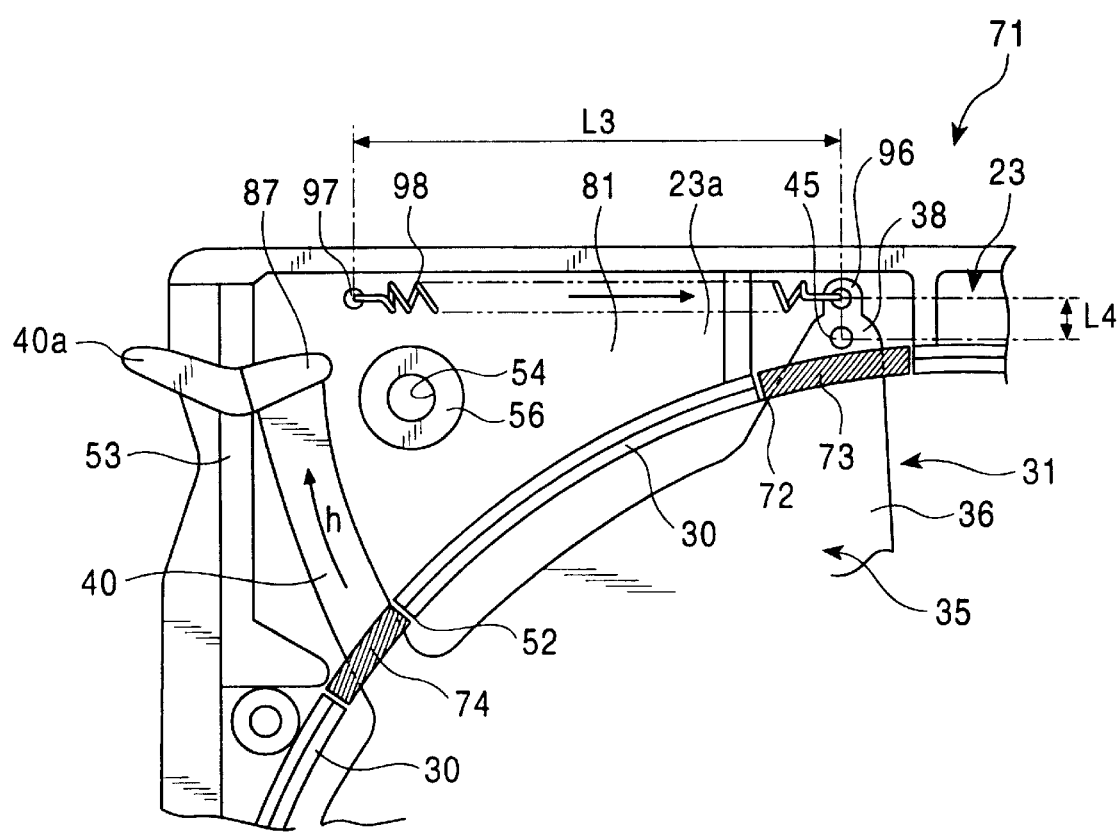
FIG. 12 is a partly cut-away top plan view of an essential section when a shutter is open in a fourth embodiment of the disk cartridge to which the present invention has been applied.
Figure 13:
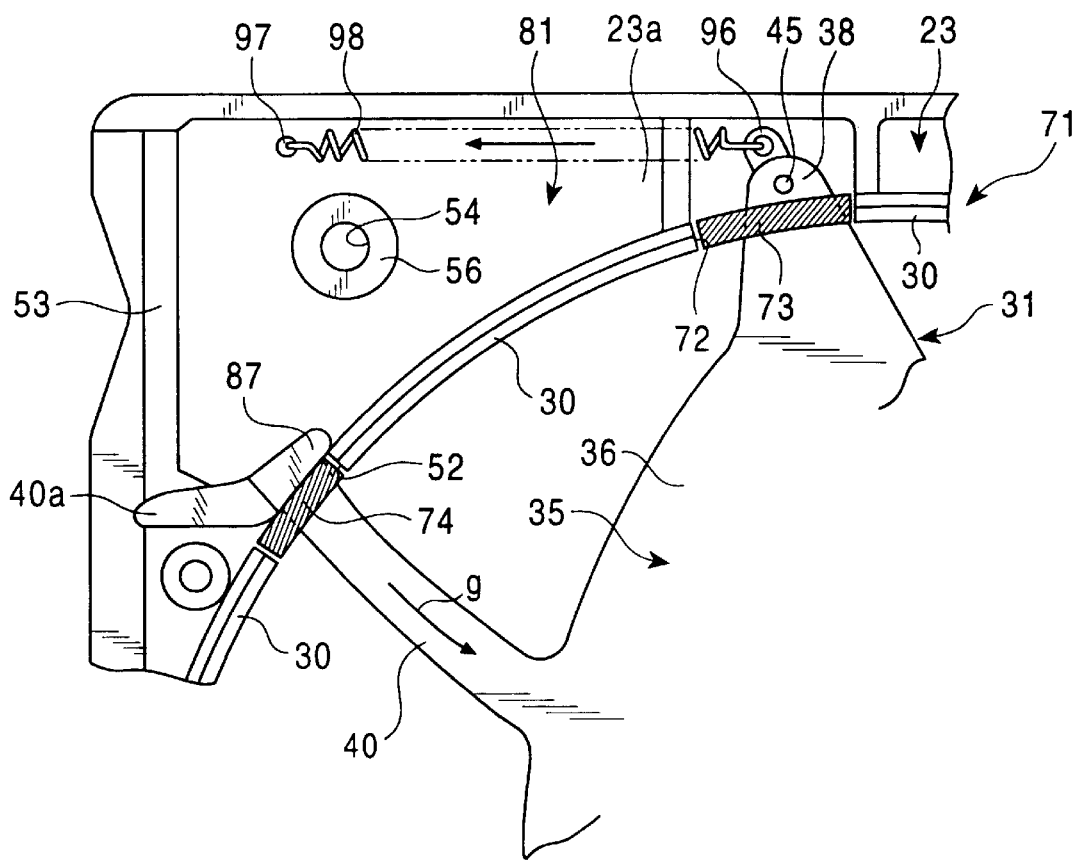
FIG. 13 is a partly cut-away top plan view when the shutter shown in FIG. 12 is closed.

Referring now to FIG. 12 and FIG. 13, a fourth embodiment of the disk cartridge 71 in accordance with the present invention will be described. In the fourth embodiment, a spring accommodation chamber 81 is extended to a pivot pin 45 of a shutter 35, and a spring retainer 96 is integrally formed on the outer side of a proximal end portion 38 of the shutter 35. In the spring accommodation chamber 81, a spring retainer 97 is integrally formed on a lower half 23 at a position that is sufficiently spaced away (by distance L3) from the pivot pin 45. Both ends of a tension coil spring 98 that is sufficiently long to be used as a shutter spring are locked on the two spring retainers 96 and 97, and the shutter 35 is rotatably driven in the direction indicated by arrow g by utilizing the tensile force of the tension coil spring 98. In this case, arm length L4 from a pivot pin 45 to the spring retainer 96 is small, requiring the spring retainer 96 to generate larger torque in order to rotatably urge the shutter 35 in the direction indicated by arrow g. It is possible, however, to obtain a sufficiently large tensile force or spring force by making length L3 of the tension coil spring 98 sufficiently large; therefore, the shutter 35 can be easily urged rotatably in the direction for closing, namely, the direction indicated by arrow g.

[Fifth Embodiment]

Figure 14:
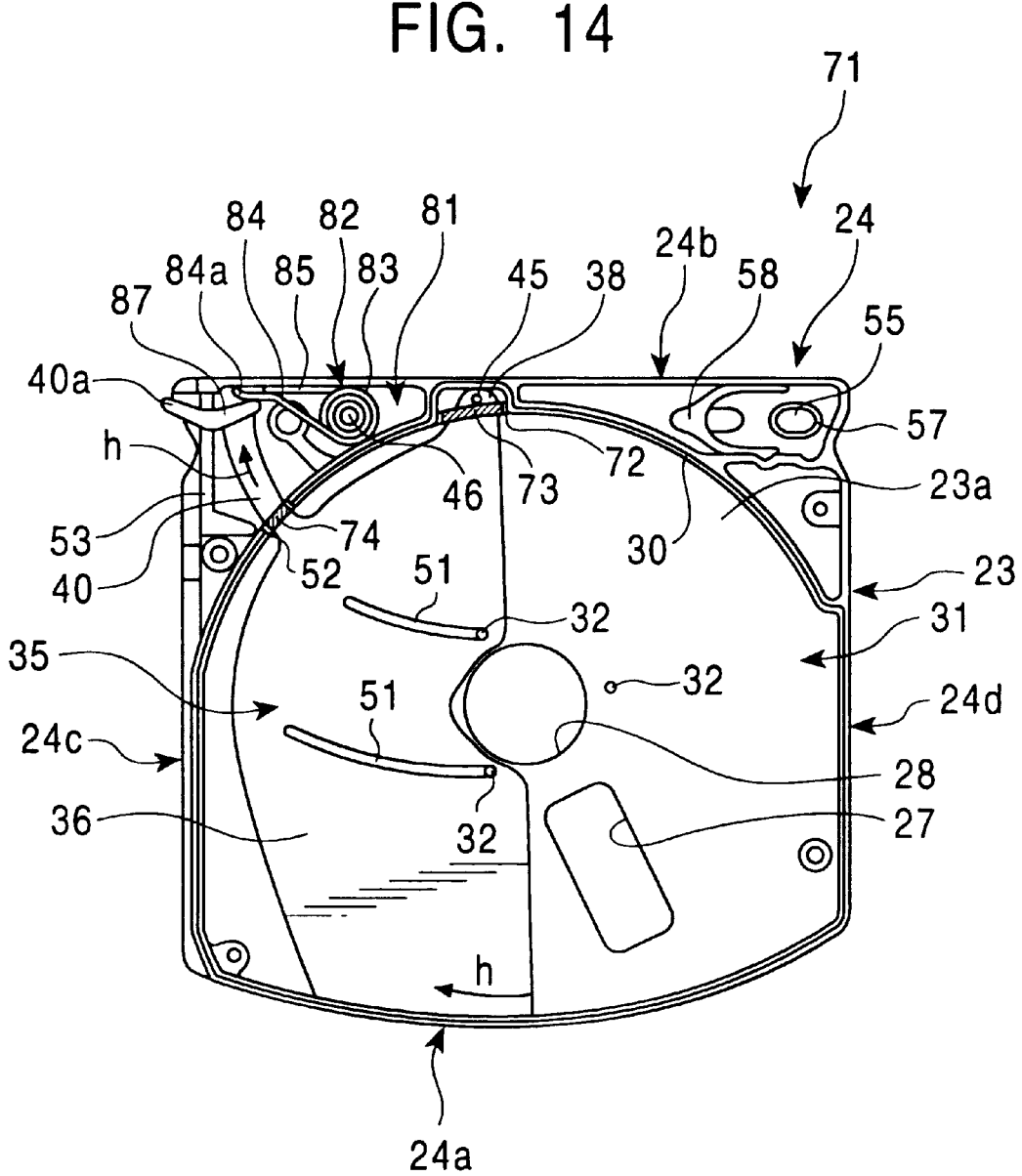
FIG. 14 is a partly cut-away top plan view of a lower half illustrating a fifth embodiment of the disk cartridge to which the present invention has been applied.
Figure 15:
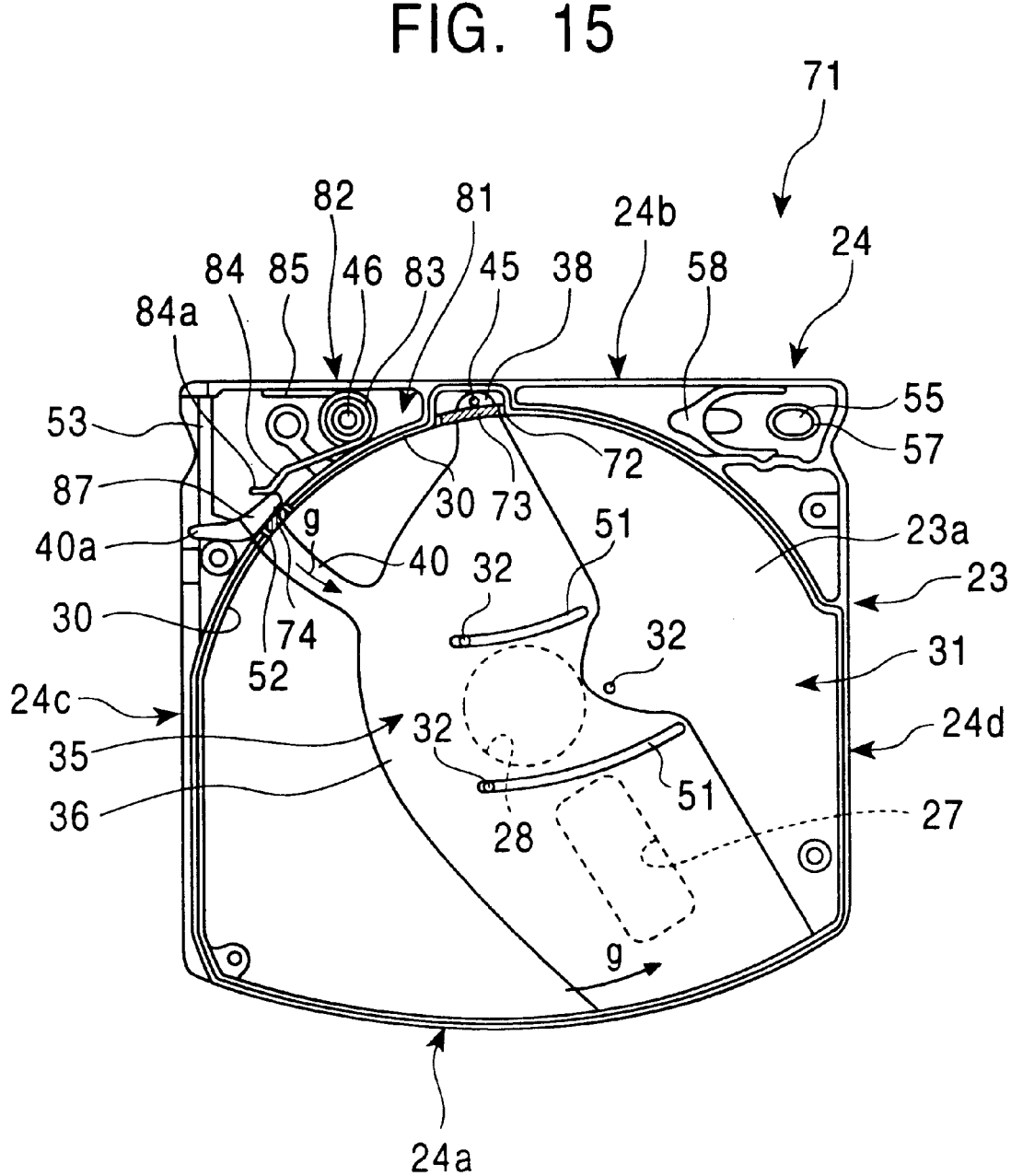
FIG. 15 is a partly cut-away top plan view of the lower half when the shutter shown in FIG. 14 is closed.
Figure 16:
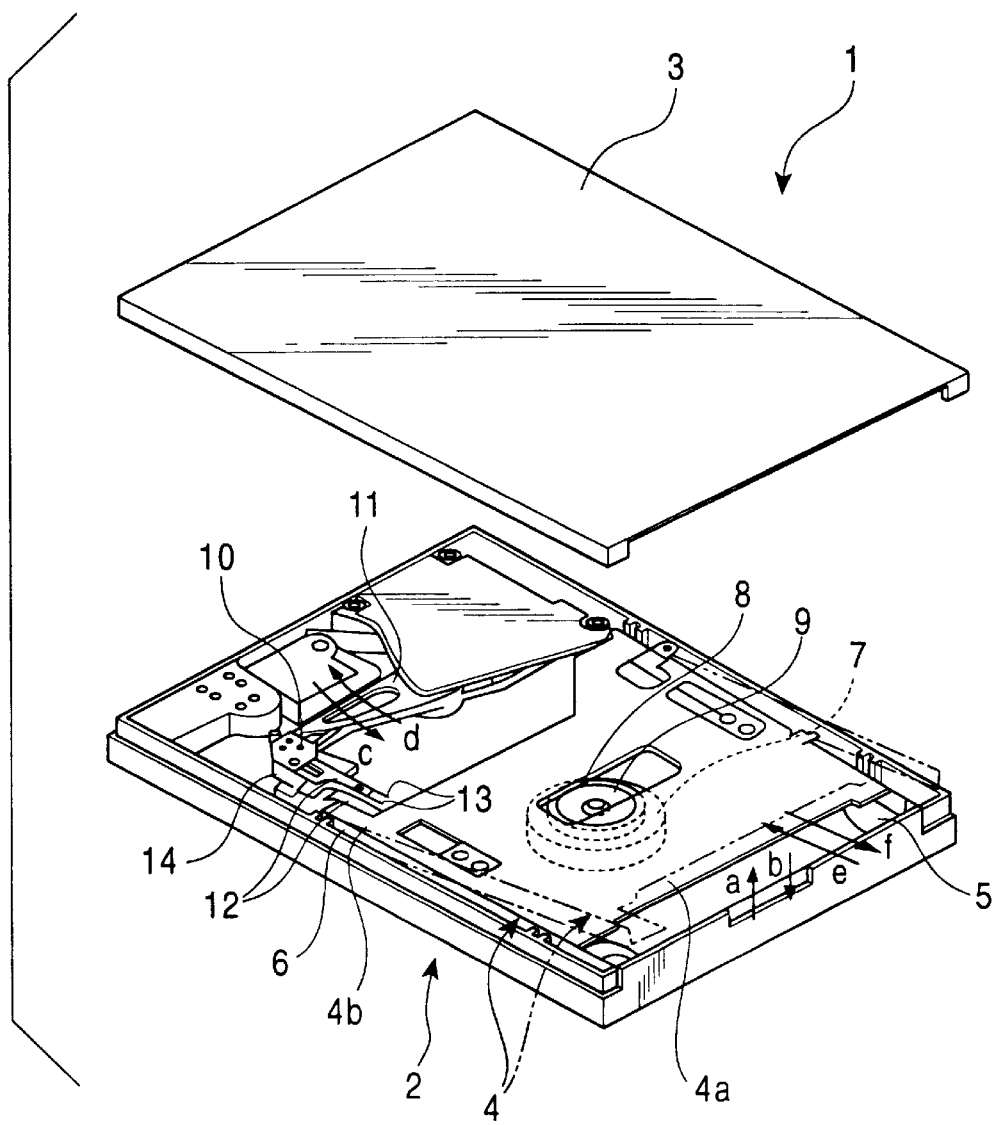
FIG. 16 is a partly exploded, perspective view illustrating a typical R-HDD.
Figure 17:
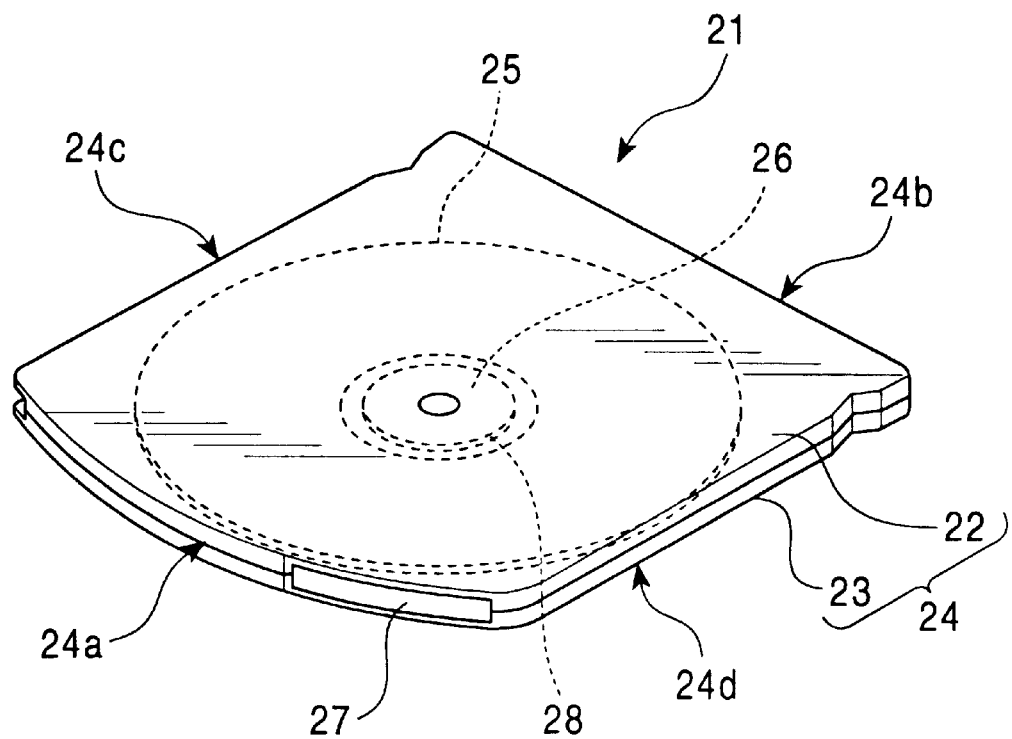
FIG. 17 is a perspective view illustrating a conventional R-HDD disk cartridge.
Figure 18:
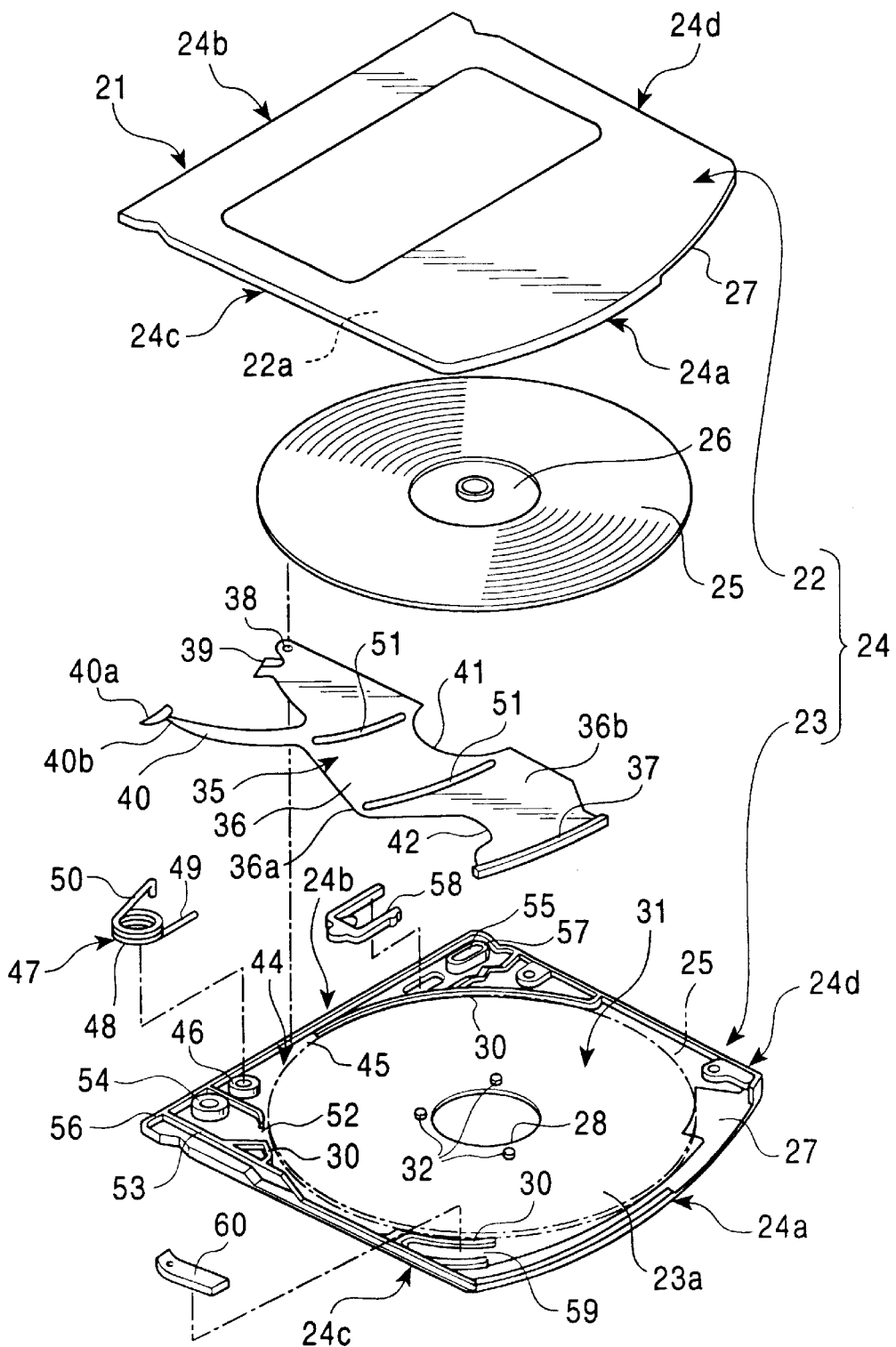
FIG. 18 is a perspective view of the entire disk cartridge shown in FIG. 17 that has been disassembled and observed from above.
Figure 19:
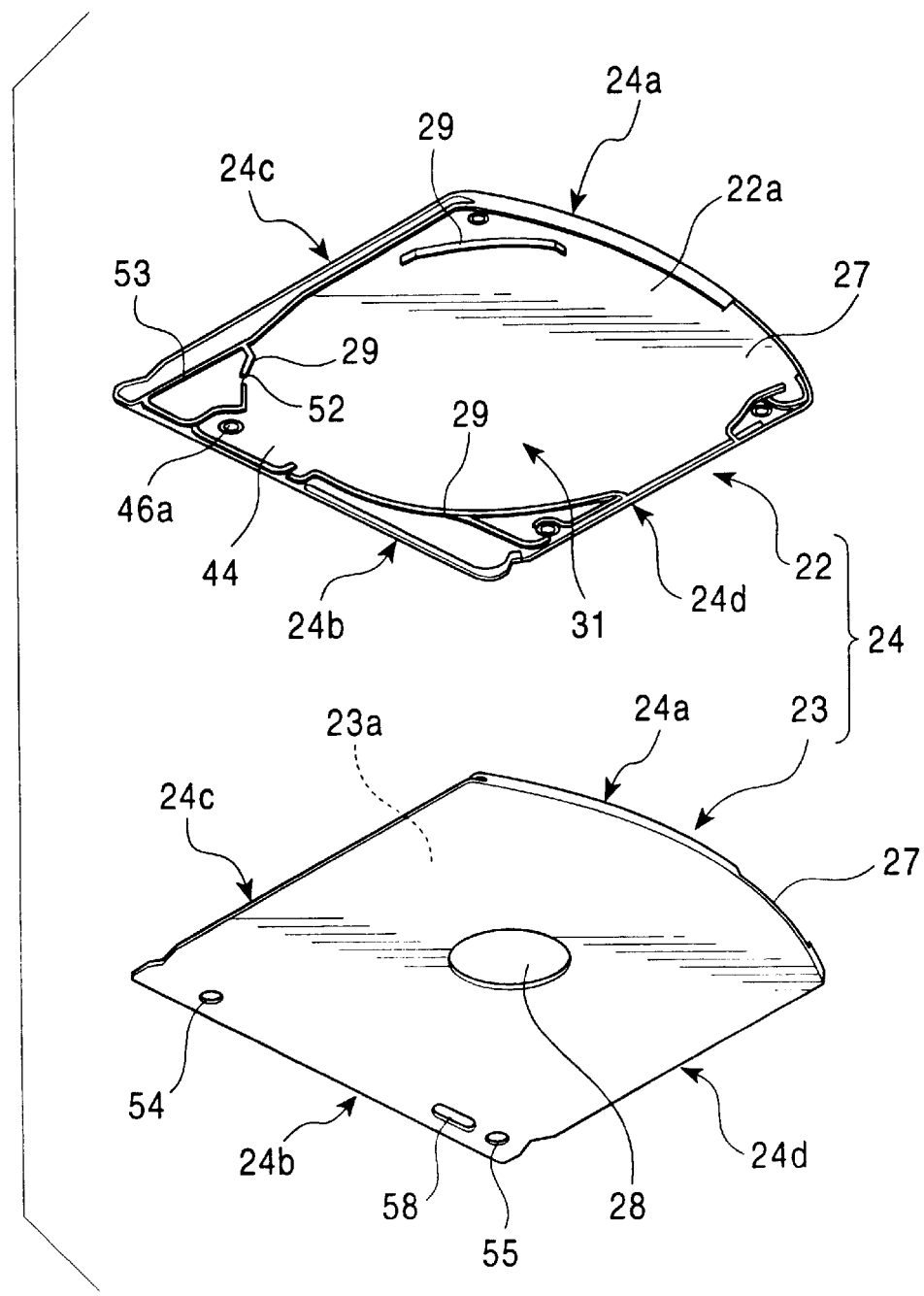
FIG. 19 is an exploded perspective view of only upper and lower halves of the disk cartridge shown in FIG. 17.
Figure 20:
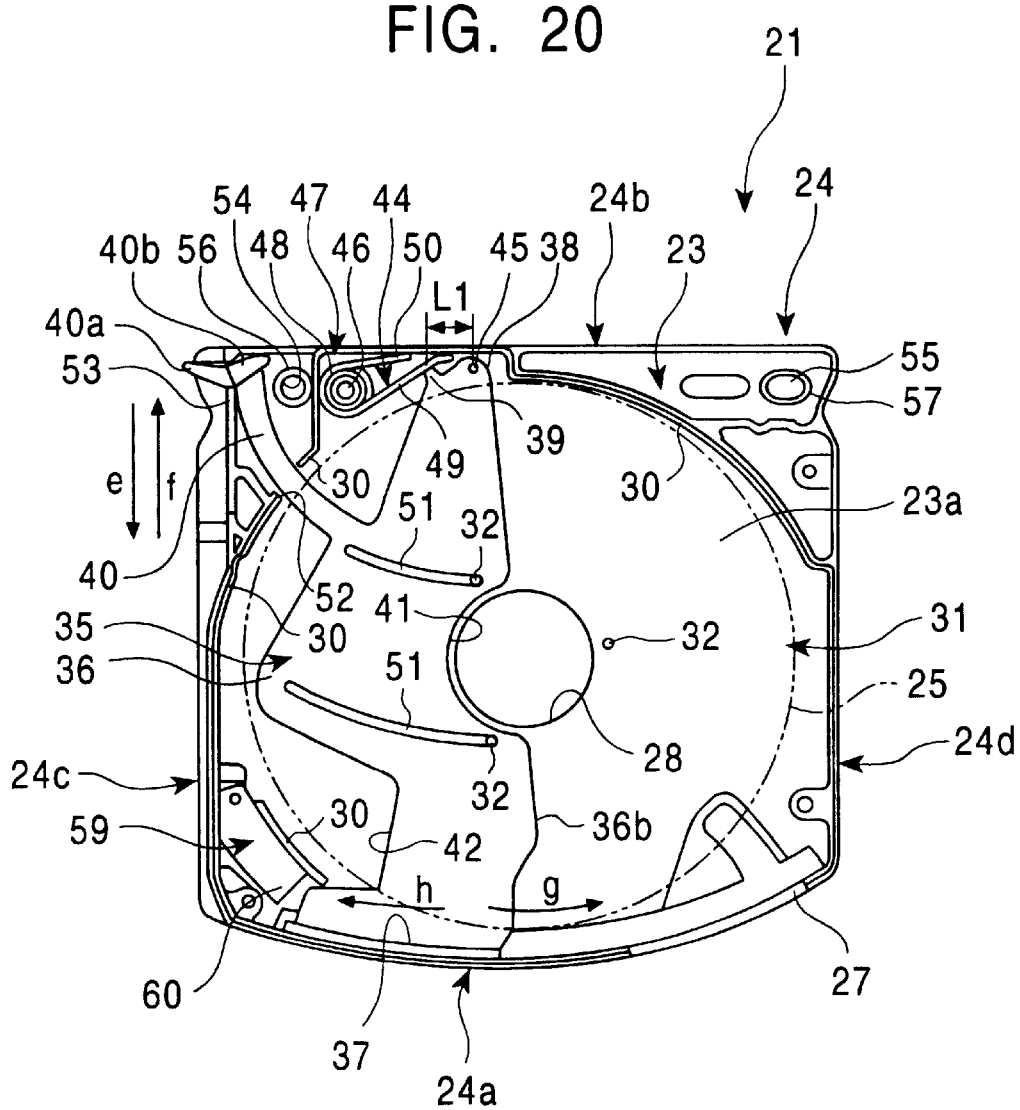
FIG. 20 is a top plan view of the lower half when a shutter of the disk cartridge shown in FIG. 17 is opened.
Figure 21:
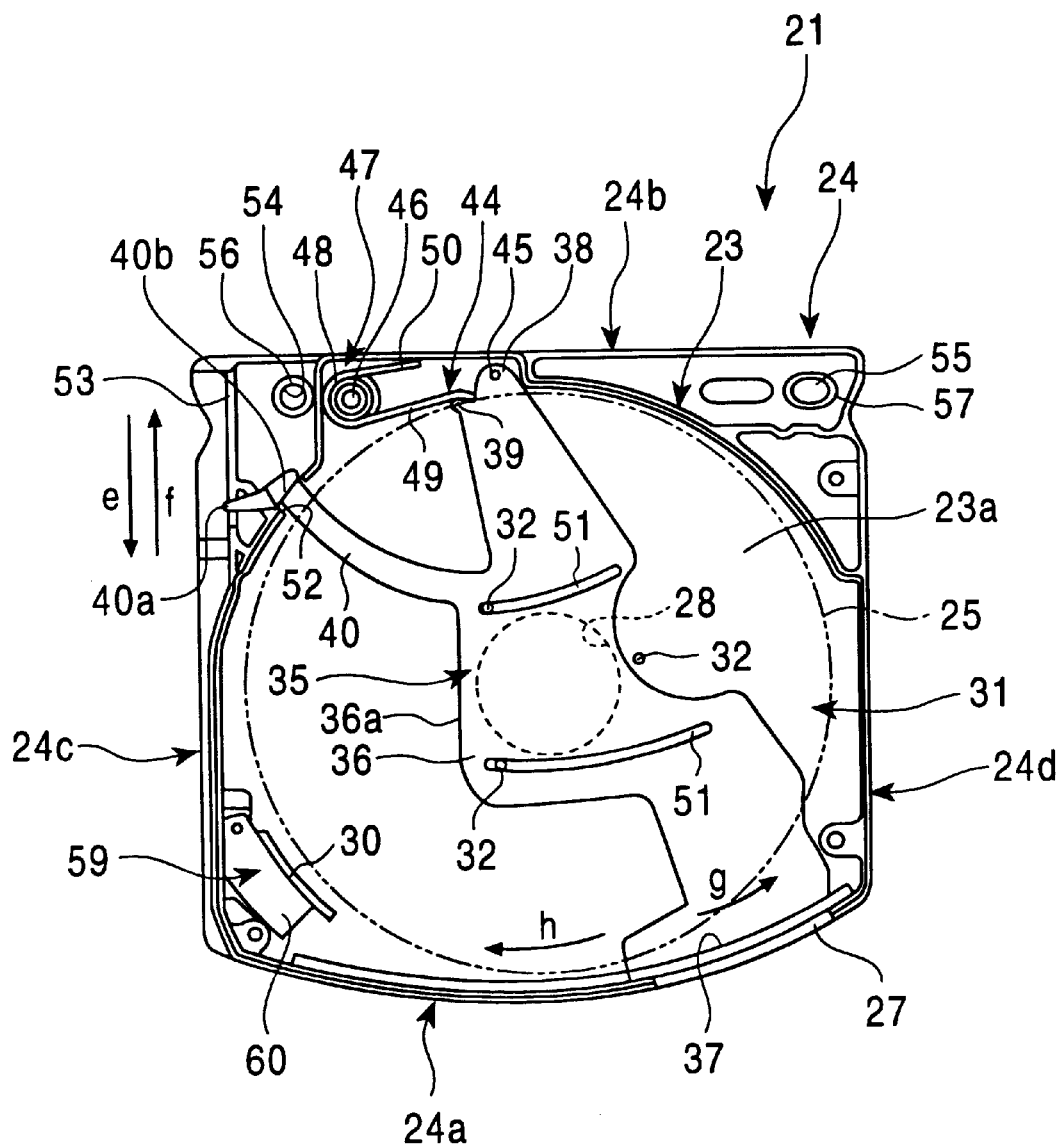
FIG. 21 is a top plan view of the lower half when the shutter shown in FIG. 20 is closed.

Referring now to FIG. 14 and FIG. 15, a fifth embodiment of the disk cartridge 71 in accordance with the present invention will be described. In the fifth embodiment, a head insertion slot 27 is formed in the bottom surface of a lower half 23 or in both top and bottom surfaces of upper and lower halves 22 and 23 rather than in a front edge 24a of a cartridge main body 24. The head insertion slot 27 and a disk table insertion aperture 28 are simultaneously opened or closed by a disk table insertion aperture opening and closing portion 36 of a shutter 35. Thus, the disk cartridge 71 in accordance with the present invention is available in a variety of modifications.

While the present invention has been described with respect to what is presently considered to be the preferred embodiments, it is to be understood that the invention is not limited to the disclosed embodiments. To the contrary, the invention is intended to cover various modifications and equivalent arrangements within the spirit of the invention. For instance, the removable hard disk has been used as the recording disk; however, the present invention can be applied to disk cartridges used for diverse applications involving various types of magnetic disks, optical disks, and magneto-optical disks.

The features of the disk cartridge in accordance with the present invention described above provide the following advantages.

The shutter spring for rotatably urging the shutter in the direction for closing is installed in the spring accommodation chamber formed outside the disk accommodation chamber by being separated using a partition. This arrangement prevents the inflow or outflow of air between the disk accommodation chamber and the spring accommodation chamber, thereby restraining an airflow in the disk accommodation chamber from being disturbed. Hence, smooth flow of the airflow is ensured, permitting markedly improved air circulation efficiency and dust collecting efficiency in the disk accommodation chamber. Moreover, since the spring accommodation chamber is separated to be outside the disk accommodation chamber by the partition, even if dust is produced in the spring accommodation chamber due to the sliding contact between the shutter spring and the shutter, it is possible to prevent such dust generated in the spring accommodation chamber from moving into the disk accommodation chamber where it may adhere to the disk therein, leading to recording and/or reproducing failure or a crash of the disk and a flying head slider.

Furthermore, according to the present invention, the arcuate upper partition and the arcuate lower partition that are integrally formed in the inner surfaces of the upper and lower halves and are vertically abutted against each other are arcuately arranged outside the disk accommodation chamber, and the end portion of the shutter that is adjacent to the rotative pivot and the opening and closing arm are inserted in the pair of recesses formed in the lower partition and projected out of the lower partition. The pair of protuberances integrally formed under the bottom edge of the upper partition is fitted into the pair of recesses from above, and the shutter spring is disposed outside the upper and lower partitions. Therefore, the upper and lower partitions on the outer periphery of the disk accommodation chamber can be formed into perfect arcs with no cutout. This arrangement prevents airflow in the disk accommodation chamber from being disturbed, so that smooth airflow can be securely obtained, permitting markedly improved air circulation efficiency and dust collection efficiency in the disk accommodation chamber.

According to the present invention, the opening and closing arm that is sufficiently spaced away from the rotative pivot of the shutter is rotatably driven by the shutter spring, so that the shutter can be rotatably driven smoothly even if when the spring force of the shutter spring is sufficiently reduced. This allows a shutter spring with a smaller spring force to be used, contributing to a reduction in size and thickness of the disk cartridge.

According to the present invention, the spring shoe is formed by outsert molding, using a synthetic resin, in the vicinity of the distal end of the opening and closing arm of the shutter, and the distal end of the operating end of the twisted coil spring constituting the shutter spring is bent in a direction such that the distal end is not directed at right angles to the spring shoe so as to prevent the distal end from coming in contact with the spring shoe at right angles. This arrangement makes it possible to restrain the dust raising problem in which synthetic resin powder is produced from the sliding contact between the operating end and the spring shoe when the shutter is opened or closed, and to restrain shutter opening or closing failure attributable to high sliding resistance between the operating end and the opening and closing arm.

In addition, according to the present invention, between the coil of the twisted coil spring and the spring shoe of the opening and closing arm, the guide rib for guiding the operating end of the twisted coil spring along the top surface of the positioning protuberance is integrally formed on the side surface of the positioning protuberance integrally formed on the lower half. The guide rib prevents the operating end from being caught on the side surface of the positioning protuberance, thereby preventing shutter opening failure. This feature permits safe and smooth opening and closing of the shutter.

What is claimed is:

1. A disk cartridge comprising:
   a cartridge main body constituted by upper and lower halves;
   a disk accommodation chamber formed in the cartridge main body;
   an information recording and/or reproducing disk rotatably accommodated in the disk accommodation chamber;
   a shutter that is disposed under the disk in the disk accommodation chamber, and circularly moved along the lower half, centering about a rotative pivot between an opening position and a closing position of at least one of a head insertion slot and a disk table insertion aperture of the cartridge main body;
   an opening and closing arm projected out of the disk accommodation chamber from a side surface of the shutter; and
   a shutter spring that is installed in the cartridge main body, and rotatably urges the shutter from the opening position toward the closing position through engagement with a synthetic resin spring shoe formed on the opening and closing arm in the vicinity of the distal end thereof by outsert molding;
   wherein a spring accommodation chamber is formed in the cartridge main body such that the spring accommodation chamber is located outside the disk accommodation chamber in the diametral direction of the disk and separated by a partition, and the shutter spring is accommodated in the spring accommodation chamber.

2. The disk cartridge according to claim 1, wherein the shutter spring is composed of a twisted coil spring.

3. The disk cartridge according to claim 1, wherein the shutter spring is composed of a compression coil spring.

4. The disk cartridge according to claim 1, wherein the shutter spring is composed of a tension coil spring.

5. The disk cartridge according to claim 1, wherein an opening and closing portion for the head insertion slot and an opening and closing portion for the disk table insertion aperture are integrally provided on the shutter to simultaneously open or close the head insertion slot and the disk table insertion aperture.

6. The disk cartridge according to claim 1, wherein a center core composed of a ferromagnetic member is secured to the center of the recording and/or reproducing disk, and detachably installed to a disk chucking portion of a recording/reproducing drive unit.

7. A disk cartridge comprising:
   a cartridge main body constituted by upper and lower halves;
   a disk accommodation chamber formed in the cartridge main body;
   an information recording and/or reproducing disk rotatably accommodated in the disk accommodation chamber;
   a shutter that is disposed under the disk in the disk accommodation chamber, and circularly moved along the lower half, centering about a rotative pivot between an opening position and a closing position of at least one of a head insertion slot and a disk table insertion aperture of the cartridge main body;
   an opening and closing arm projected out of the disk accommodation chamber from a side surface of the shutter; and
   a shutter spring that is installed in the cartridge main body, and rotatably urges the shutter from the opening position to the closing position through engagement with a synthetic resin spring shoe formed on the opening and closing arm in the vicinity of the distal end thereof by outsert molding;
   wherein arcuate upper and lower partitions that are integrally formed on the inner surfaces of the upper and lower halves, respectively, and vertically abutted against each other are arcuately arranged along the outer side of the disk accommodation chamber,
   the end portion of the shutter that is adjacent to the rotative pivot and the opening and closing arm are inserted in a pair of recesses formed in the lower partition and projected out of the lower partition,
   a pair of protuberances integrally formed under the bottom edge of the upper partition are fitted into the pair of recesses from above, and
   the shutter spring is disposed outside the upper partition and the lower partition.

8. The disk cartridge according to claim 7, wherein the shutter spring is composed of a twisted coil spring.

9. The disk cartridge according to claim 7, wherein the shutter spring is composed of a compression coil spring.

10. The disk cartridge according to claim 7, wherein the shutter spring is composed of a tension coil spring.

11. The disk cartridge according to claim 7, wherein an opening and closing portion for the head insertion slot and an opening and closing portion for the disk table insertion aperture are integrally provided on the shutter to simultaneously open or close the head insertion slot and the disk table insertion aperture.

12. The disk cartridge according to claim 7, wherein a center core composed of a ferromagnetic member is secured to the center of the recording and/or reproducing disk, and detachably attached to a disk chucking portion of a recording/reproducing drive unit.

13. A disk cartridge comprising:
   a cartridge main body constituted by upper and lower halves;
   a disk accommodation chamber formed in the cartridge main body;
   an information recording and/or reproducing disk rotatably accommodated in the disk accommodation chamber;
   a shutter that is disposed under the disk in the disk accommodation chamber, and circularly moved along the lower half, centering about a rotative pivot between an opening position and a closing position of at least one of a head insertion slot and a disk table insertion aperture of the cartridge main body;
   an opening and closing arm projected out of the disk accommodation chamber from a side surface of the shutter; and
   a shutter spring that is installed in the cartridge main body, and rotatably urges the shutter from the opening position toward the closing position through engagement with a synthetic resin spring shoe formed on the opening and closing arm in the vicinity of the distal end thereof by outsert molding;
   wherein a spring accommodation chamber is formed in the cartridge main body such that the spring accommodation chamber is located outside the disk accommodation chamber in the diametral direction of the disk and separated by a partition, the shutter spring is accommodated in the spring accommodation chamber.

14. The disk cartridge according to claim 13,
   wherein the shutter spring is constituted by a twisted coil spring, and
   the distal end of an operating end of the twisted coil spring is bent in a direction such that the distal end is not directed at right angles to the spring shoe so as to prevent the distal end from coming in contact with the spring shoe at right angles.

15. The disk cartridge according to claim 14, wherein, between the coil of the twisted coil spring and the spring shoe of the opening and closing arm, a guide rib is integrally formed on the side surface of a positioning protuberance integrally formed on the lower half, and the operating end of the twisted coil spring is guided along the upper surface of the protuberance by the guide rib.

16. The disk cartridge according to claim 13, wherein an opening and closing portion for the head insertion slot and an opening and closing portion for the disk table insertion aperture are integrally provided on the shutter to simultaneously open or close the head insertion slot and the disk table insertion aperture.

17. The disk cartridge according to claim 13, wherein a center core composed of a ferromagnetic member is secured to the center of the recording and/or reproducing disk, and detachably attached to a disk chucking portion of a recording/reproducing drive unit.

* * * * *